United States Patent
Habif et al.

(10) Patent No.: US 12,411,041 B2
(45) Date of Patent: Sep. 9, 2025

(54) OFF-AXIS LASER DETECTION

(71) Applicant: UNIVERSITY OF SOUTHERN CALIFORNIA, Los Angeles, CA (US)

(72) Inventors: Jonathan Habif, Los Angeles, CA (US); Andrew Rittenbach, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 185 days.

(21) Appl. No.: 18/082,268

(22) Filed: Dec. 15, 2022

(65) Prior Publication Data

US 2023/0332946 A1 Oct. 19, 2023

Related U.S. Application Data

(60) Provisional application No. 63/289,891, filed on Dec. 15, 2021.

(51) Int. Cl.
*G01J 1/42* (2006.01)
*G06T 7/11* (2017.01)
*G06T 7/136* (2017.01)
*G06T 7/155* (2017.01)
*G06T 7/254* (2017.01)

(52) U.S. Cl.
CPC ............ *G01J 1/4257* (2013.01); *G06T 7/11* (2017.01); *G06T 7/136* (2017.01); *G06T 7/155* (2017.01); *G06T 7/254* (2017.01); *G06T 2207/10004* (2013.01); *G06T 2207/20048* (2013.01)

(58) Field of Classification Search
CPC ......... G01J 1/4257; G06T 7/11; G06T 7/136; G06T 7/155; G06T 7/254; G06T 2207/10004; G06T 2207/20048; G06T 5/70; G06T 5/73
See application file for complete search history.

(56) References Cited

U.S. PATENT DOCUMENTS

| | | | | |
|---|---|---|---|---|
| 2006/0126959 A1* | 6/2006 | Padwick | ................ | G06V 20/13 382/254 |
| 2007/0030998 A1* | 2/2007 | O'Hara | ................ | G06V 20/13 382/100 |
| 2009/0180704 A1* | 7/2009 | Wey | ................ | G06T 5/50 382/254 |
| 2016/0051218 A1* | 2/2016 | Ohishi | ................ | G06T 7/11 600/431 |
| 2016/0265907 A1* | 9/2016 | Arora | ................ | H04N 23/56 |
| 2017/0219426 A1* | 8/2017 | Pacala | ................ | G01S 17/89 |
| 2017/0256061 A1* | 9/2017 | Wang | ................ | G06T 7/11 |
| 2022/0170783 A1* | 6/2022 | Kowarz | ................ | G01J 1/4257 |

* cited by examiner

Primary Examiner — Amara Abdi
(74) Attorney, Agent, or Firm — Snell & Wilmer LLP

(57) ABSTRACT

Systems and methods for off-axis detection of a laser source. The system may include an optical sensor configured to detect light, a focusing lens adjacent to an input of the optical sensor and configured to focus the light and an optical filter adjacent to an input of the focusing lens and configured to filter a wavelength of the light. A processor may be connected to the optical sensor and may implement disclosed methods to analyze data from the optical sensor to detect atmospheric scattering of laser light from the laser source.

17 Claims, 20 Drawing Sheets

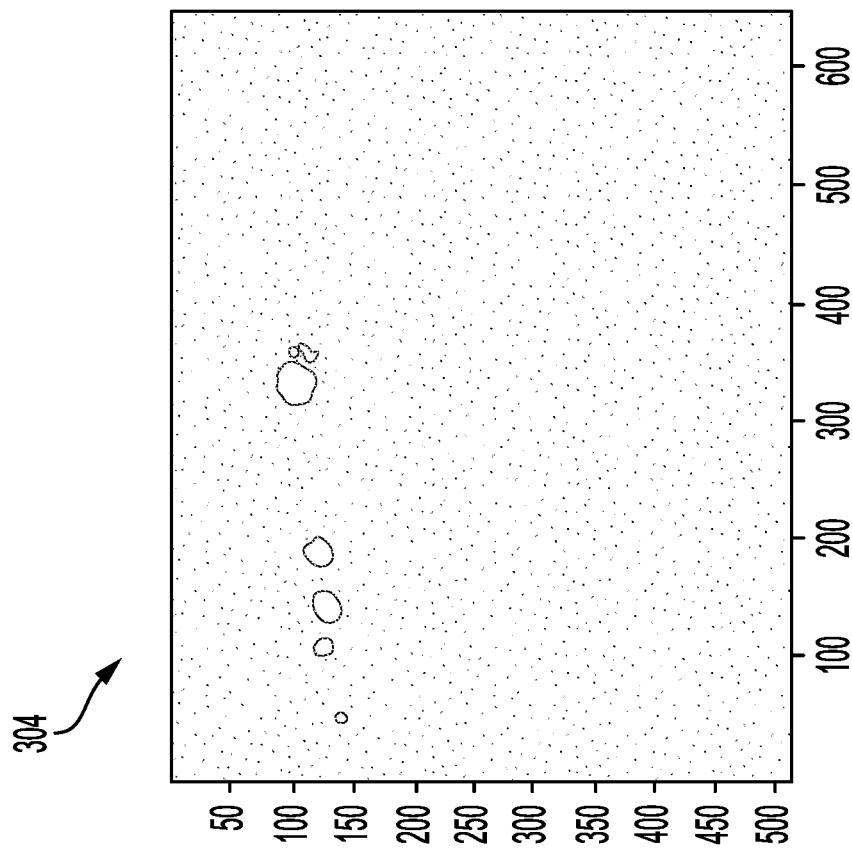
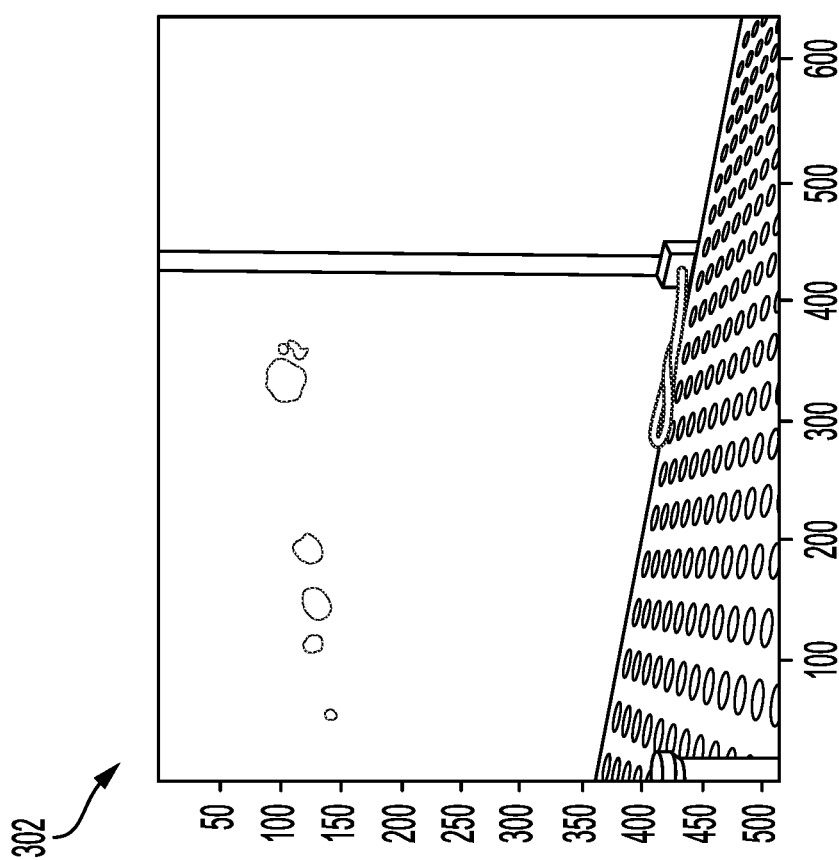
FIG. 3A
FIG. 3B

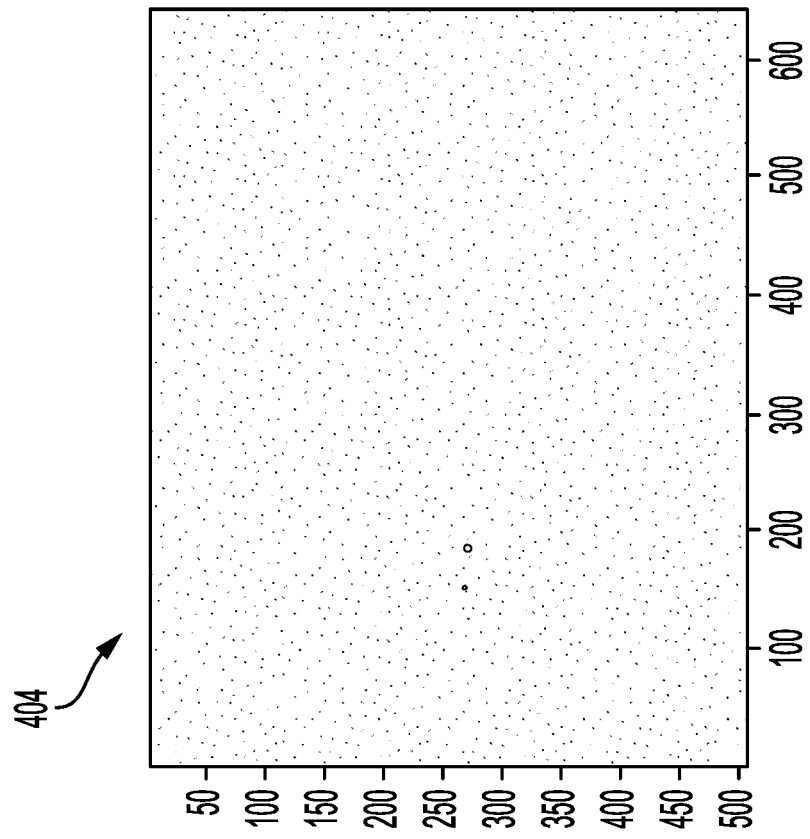
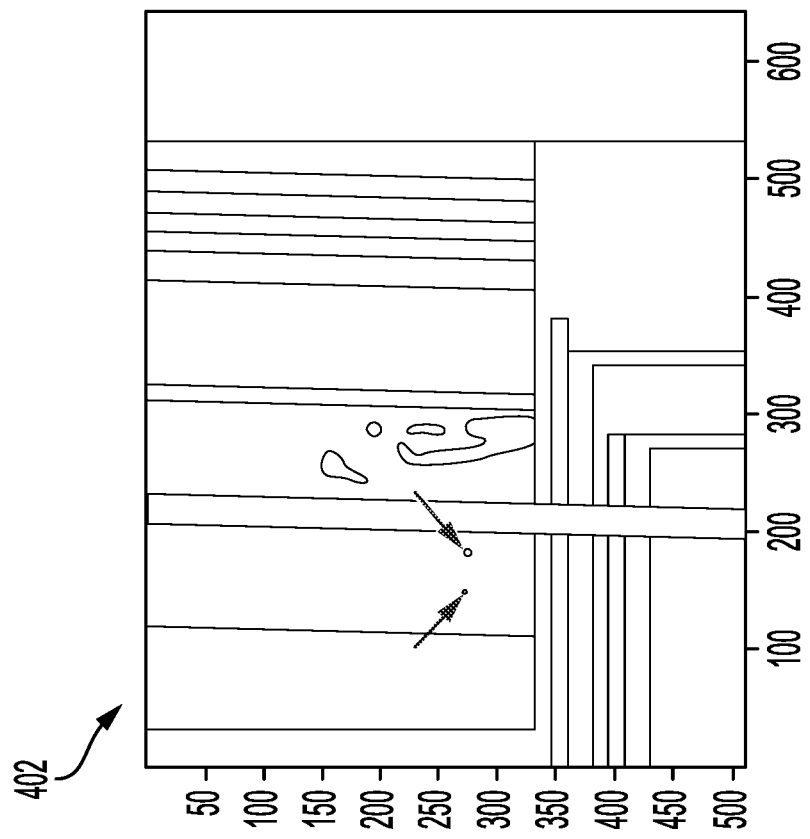
FIG. 4A
FIG. 4B

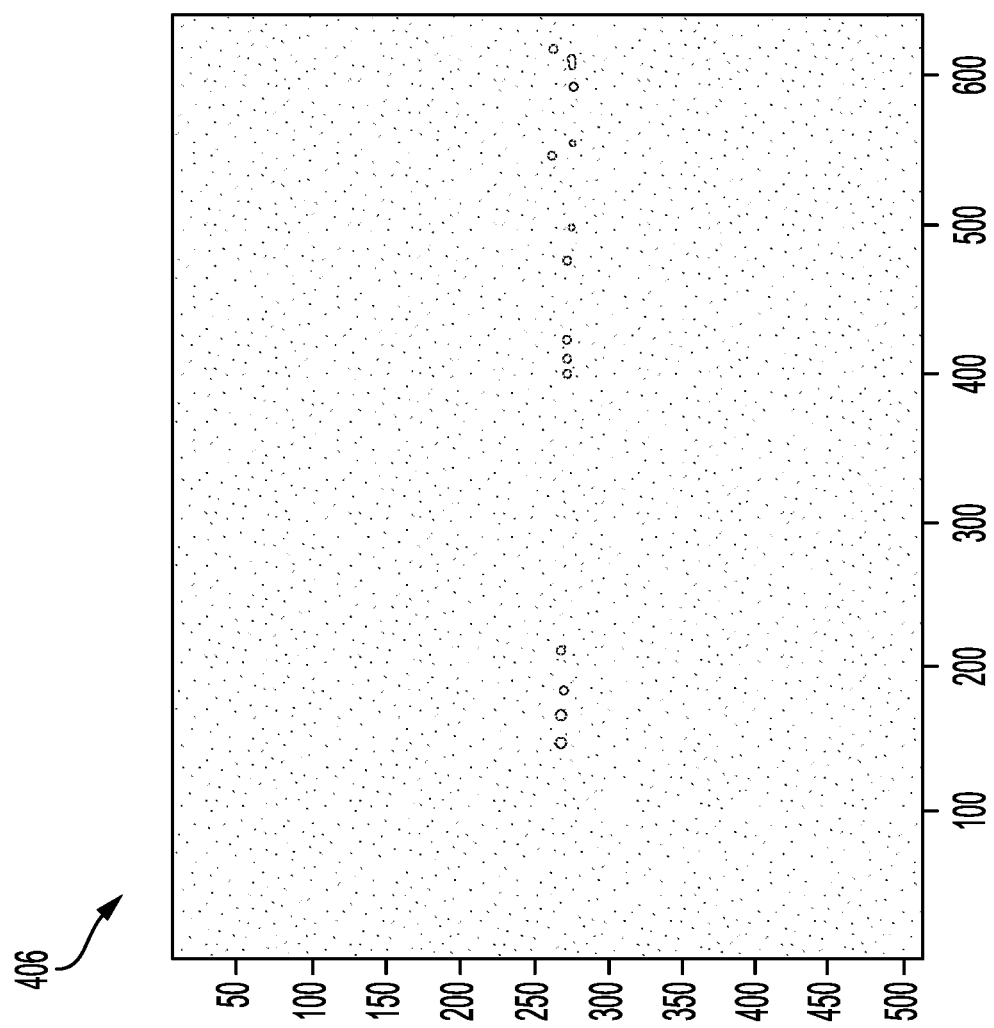

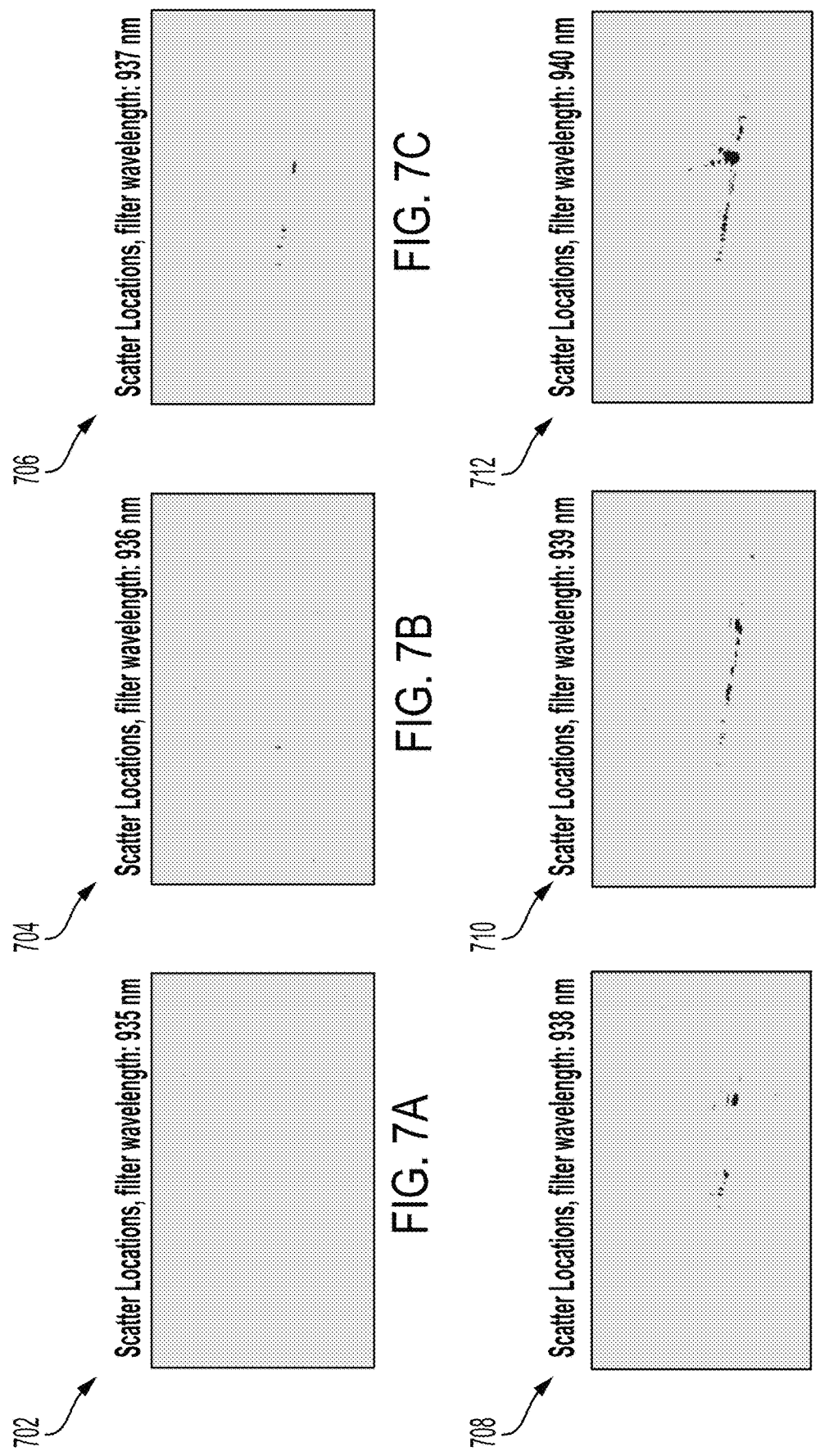

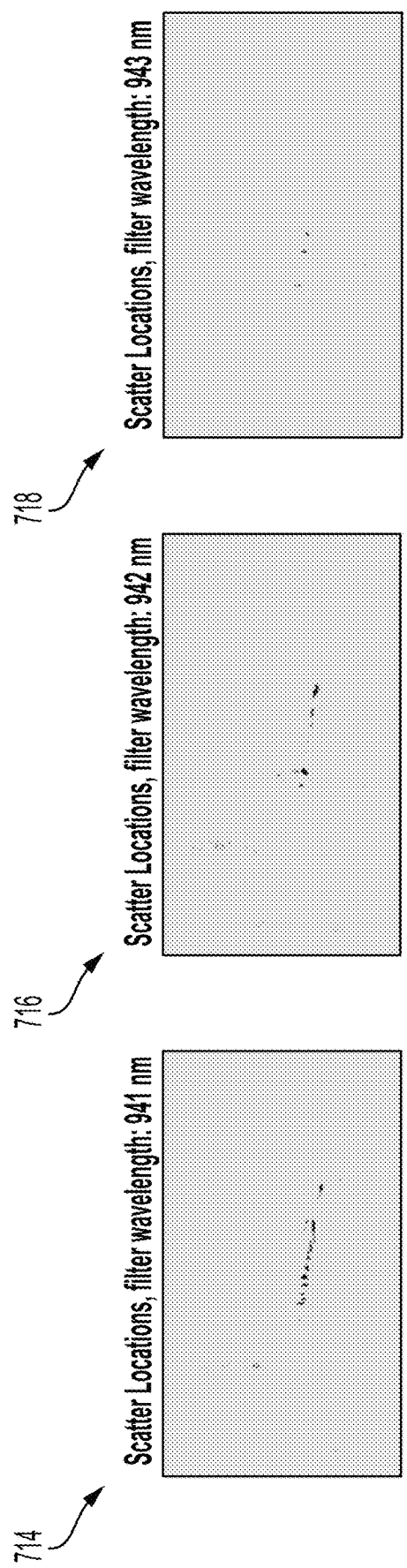

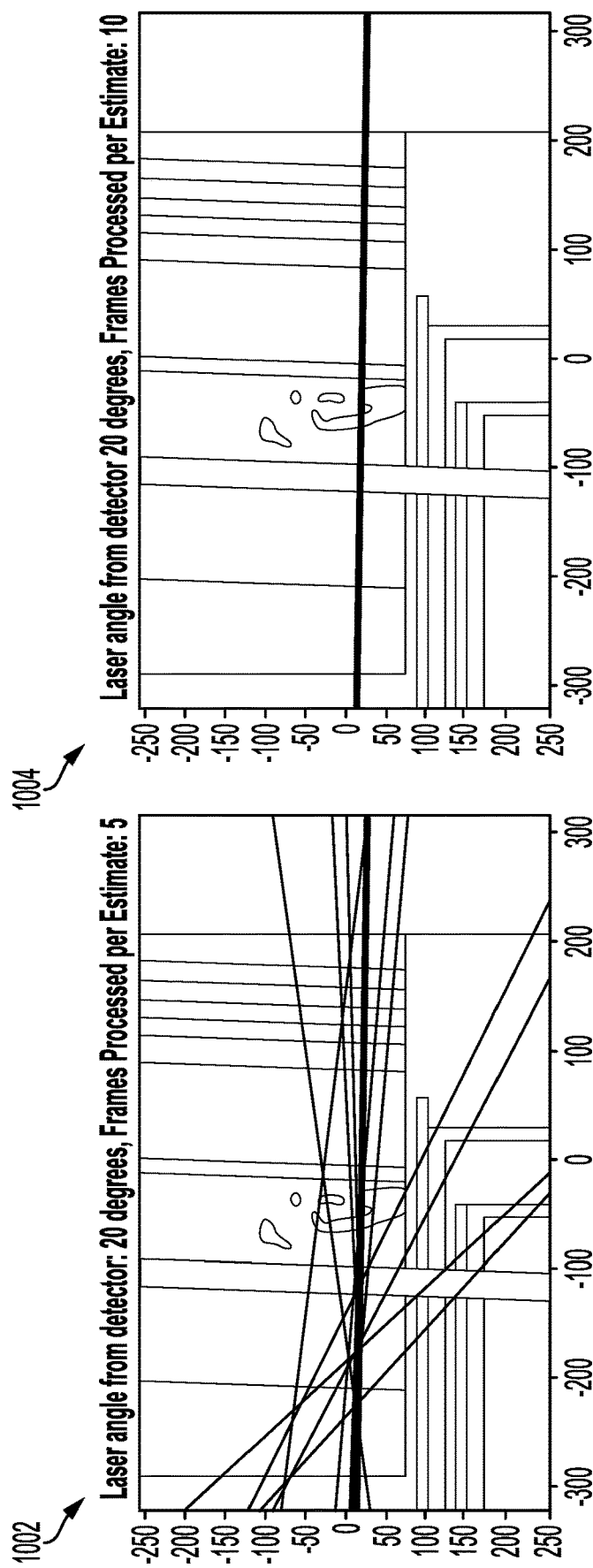

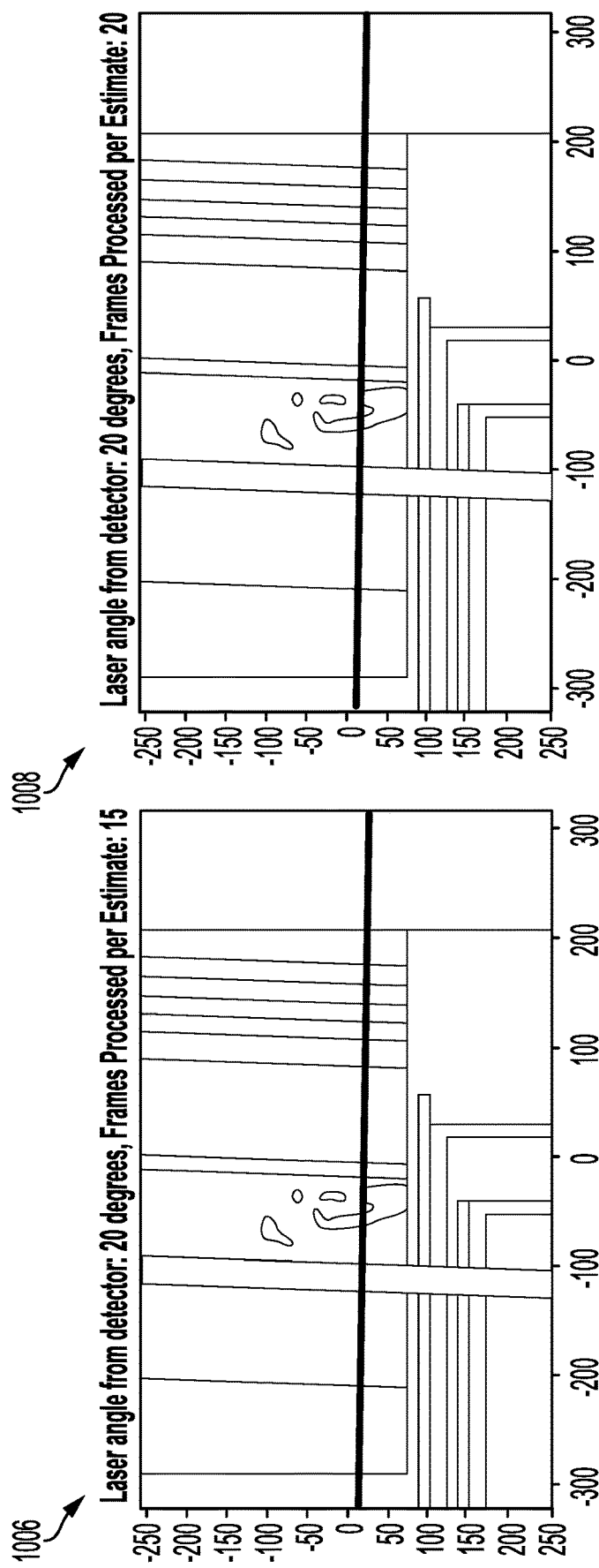

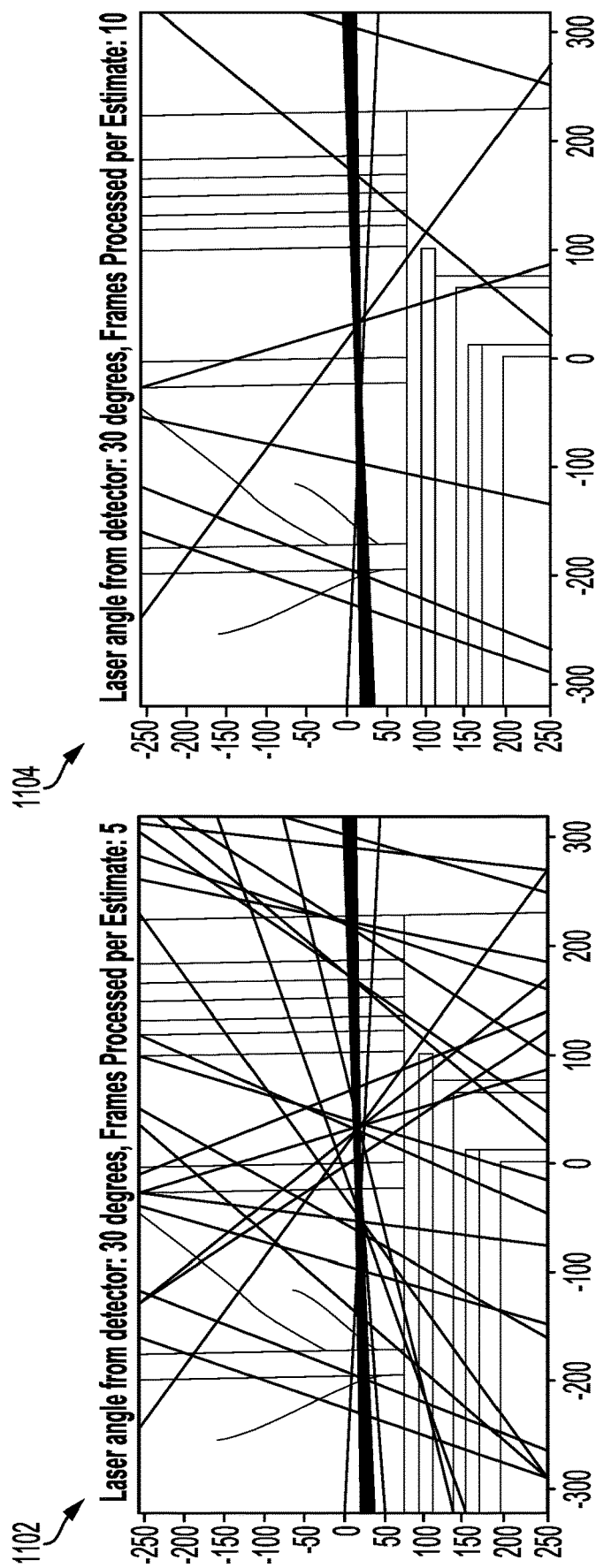

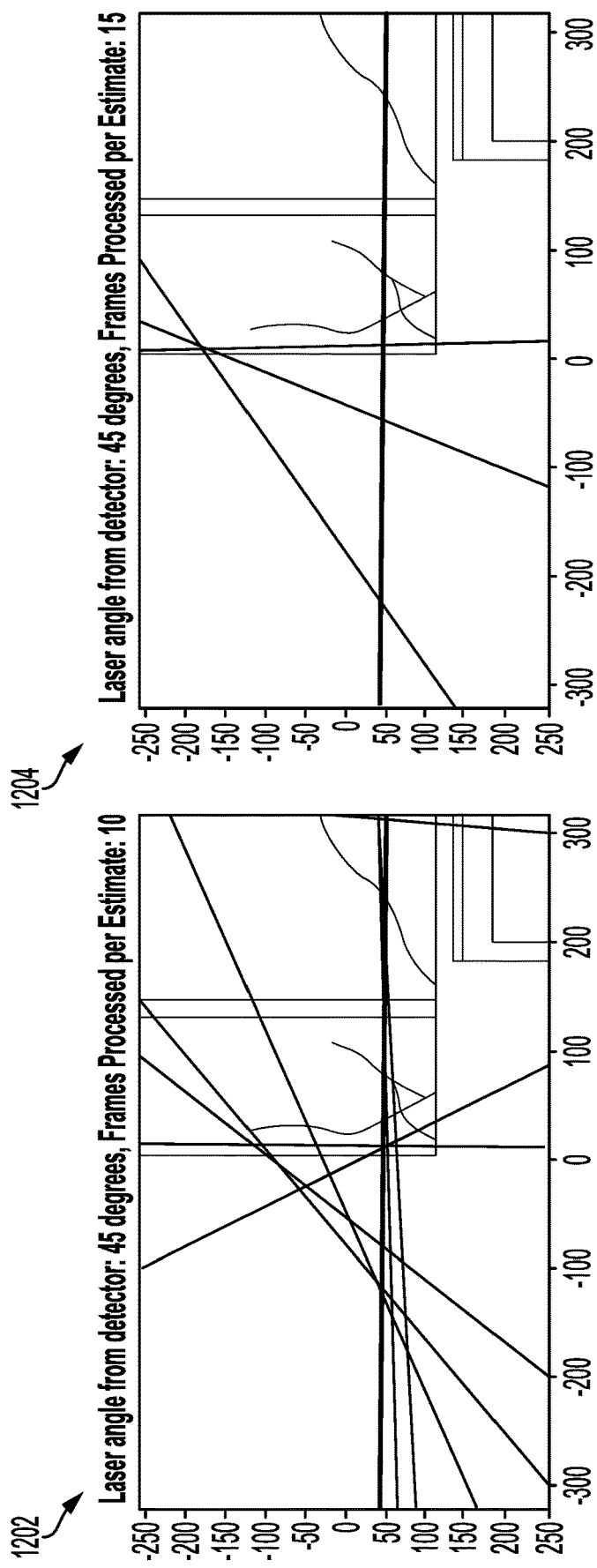

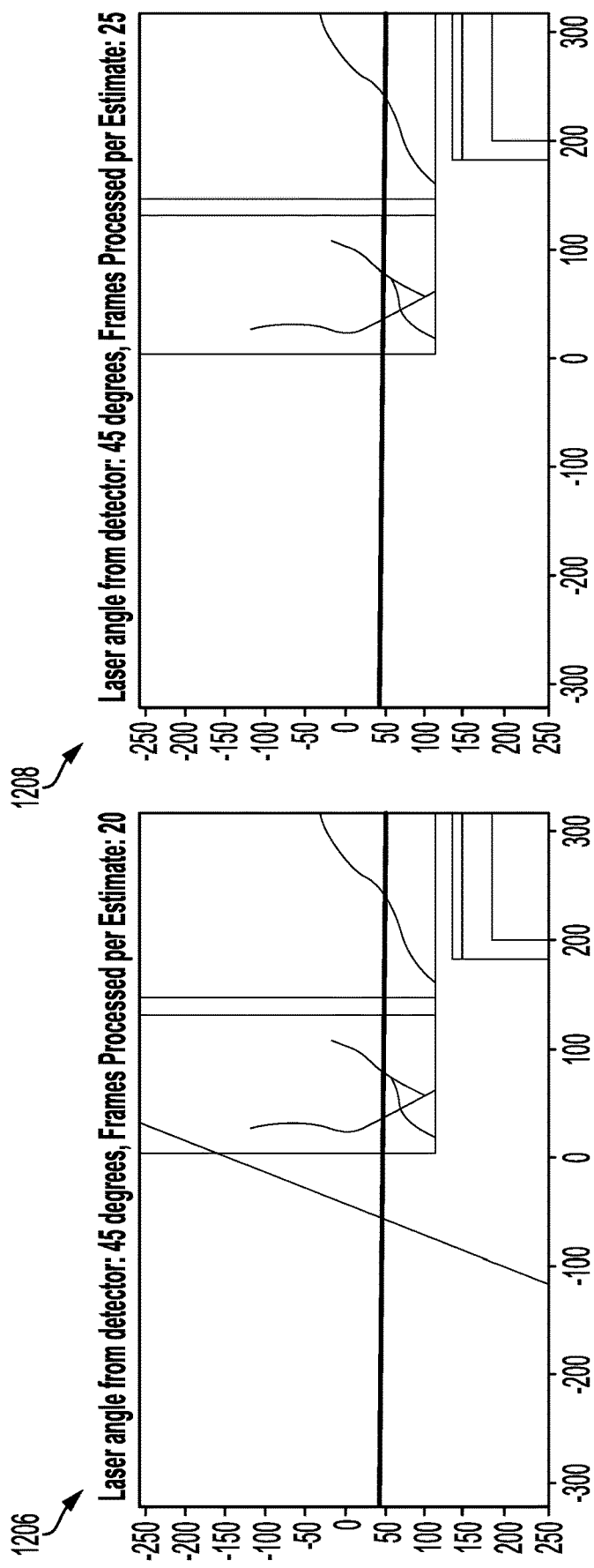

OFF-AXIS LASER DETECTION

CROSS-REFERENCE TO RELATED APPLICATIONS

This application is based upon and claims priority to U.S. Provisional Patent Application No. 63/289,891 entitled "OFF-AXIS LASER DETECTION" and filed on Dec. 15, 2021, the entire content of which is incorporated herein by reference.

STATEMENT AS TO FEDERALLY SPONSORED RESEARCH OR DEVELOPMENT

This invention was made with Government support under Contract No. HR001120C0190 awarded by the Defense Advanced Research Projects Agency (DARPA). The Government has certain rights in this invention.

FIELD

The present disclosure relates to laser detection, and more specifically, to off-axis laser detection.

BACKGROUND

The identification and localization of laser threats in a free-space channel is an increasingly important capability as active laser sensors become more widely used in civilian and military applications. Challenges arise when the laser threat is off-axis, but early identification of a laser source requires off-axis detection of laser light scattered out of the optical channel by molecules and aerosols in the free-space channel. Thus, there remains a need for the development of a sensor system for the off-axis detection of scattered laser light from a non-cooperative laser source.

SUMMARY

A method for off-axis detection of a laser source by an optical sensor connected to a processor is provided. In addition, a computer-readable medium is provided for storing instructions that when executed by a processor cause the processor to perform the method for off-axis detection of a laser source by an optical sensor connected to a processor. The method may include various aspects. For instance, the method may include collecting a plurality of images by the optical sensor. The method may include subtracting, by the processor, a background noise from each image of the plurality of images. The method may include applying, by the processor, image thresholding to each image of the plurality of images. The method may include binarizing, by the processor, each image of the plurality of images. The method may include summing, by the processor, the each binarized image to create a single combined binarized image. The method may include performing, by the processor, morphological processing on the single combined binarized image. The morphological processing may at least one of (i) reduce noise and (ii) remove unwanted structures in the single combined binarized image. The method may include analyzing, by the processor, the single combined binarized image to detect atmospheric scattering corresponding to presence of laser light emitted by the laser source.

In various embodiments, one or more further aspect is included. For instance, subtracting the background noise further includes averaging at least one image of the plurality of images pixel-by-pixel to generate an average background data mask and subtracting for each image of the plurality of images the average background data mask from each image. The binarizing of each image may cause only portions of each image corresponding to the atmospheric scattering to have a binary value of 1 and other portions of each image to have the binary value of 0. The summing the binarized images may cause the atmospheric scattering corresponding to the presence of laser light to be combined in the single combined binarized image. The morphological processing may include deleting any structures with (a) five or fewer fully connected pixels or (b) greater than 20 fully connected pixels. The atmospheric scattering may be Mie scattering or Rayleigh scattering. The method may further include taking a Radon transform of the single combined binarized image to identify a first location estimate of a path of the laser light in the single combined binarized image. The binarizing of each image may include applying Otsu's method to the each image.

In various embodiments, the method includes tuning a center wavelength of an optical filter adjacent to the optical sensor, wherein the center wavelength is tuned to approximately a wavelength of the laser light emitted by the laser source. The method may include tuning a center wavelength of an optical filter adjacent to the optical sensor to different center wavelengths and comparing a measured intensity of the detected atmospheric scattering at the different center wavelengths to determine the center wavelength associated with a peak of the measured intensity. The center wavelength associated with the peak of the measured intensity may correspond to a wavelength of the laser light emitted by the laser source. The center wavelength of the optical filter may be tunable between 850 nm and 1976 nm.

A system for off-axis detection of a laser source is provided. The system may include an optical sensor configured to detect light. The system may include a focusing lens adjacent to an input of the optical sensor and configured to focus the light. The system may include an optical filter adjacent to an input of the focusing lens and configured to filter a wavelength of the light. The system may include a processor connected to the optical sensor and configured to analyze data from the optical sensor to detect atmospheric scattering of laser light from the laser source.

The system may include one or more further aspects. For example, the optical filter may be electronically tunable and may have a tunable center wavelength. The focusing lens may be optimized for a near infrared wavelength. The optical sensor may be a focal plane array. The focal plane array may be a cooled InGaAs focal plane array configured to capture Mie scattering events caused by the laser source interacting with atmospheric dust particles.

The forgoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 3A illustrates raw data collection, in accordance with various embodiments;

FIG. 3B illustrates an image processed to extract Mie scattering events from the image, in accordance with various embodiments;

FIG. 4A depicts an image showing an unprocessed frame with two Mie scattering events identified, in accordance with various embodiments;

FIG. 4B shows an image depicting results after processing the raw image, in accordance with various embodiments;

FIG. 4C illustrates an image that shows a sample result from processing 20 frames and then summing generated binary images together, in accordance with various embodiments;

FIGS. 7A-K illustrate sample processed images which show extracted scattering events from data collected at each filter setting, in accordance with various embodiments;

FIGS. 10A-D provides illustrations showing laser localization for a 20-degree dataset for various image stack sizes, in accordance with various embodiments;

FIGS. 11A-D provides illustrations showing laser localization for a 30-degree dataset for various image stack sizes, in accordance with various embodiments;

FIGS. 12A-D provides illustrations showing laser localization for a 45-degree dataset for various image stack sizes, in accordance with various embodiments;

DETAILED DESCRIPTION

Figure 1:
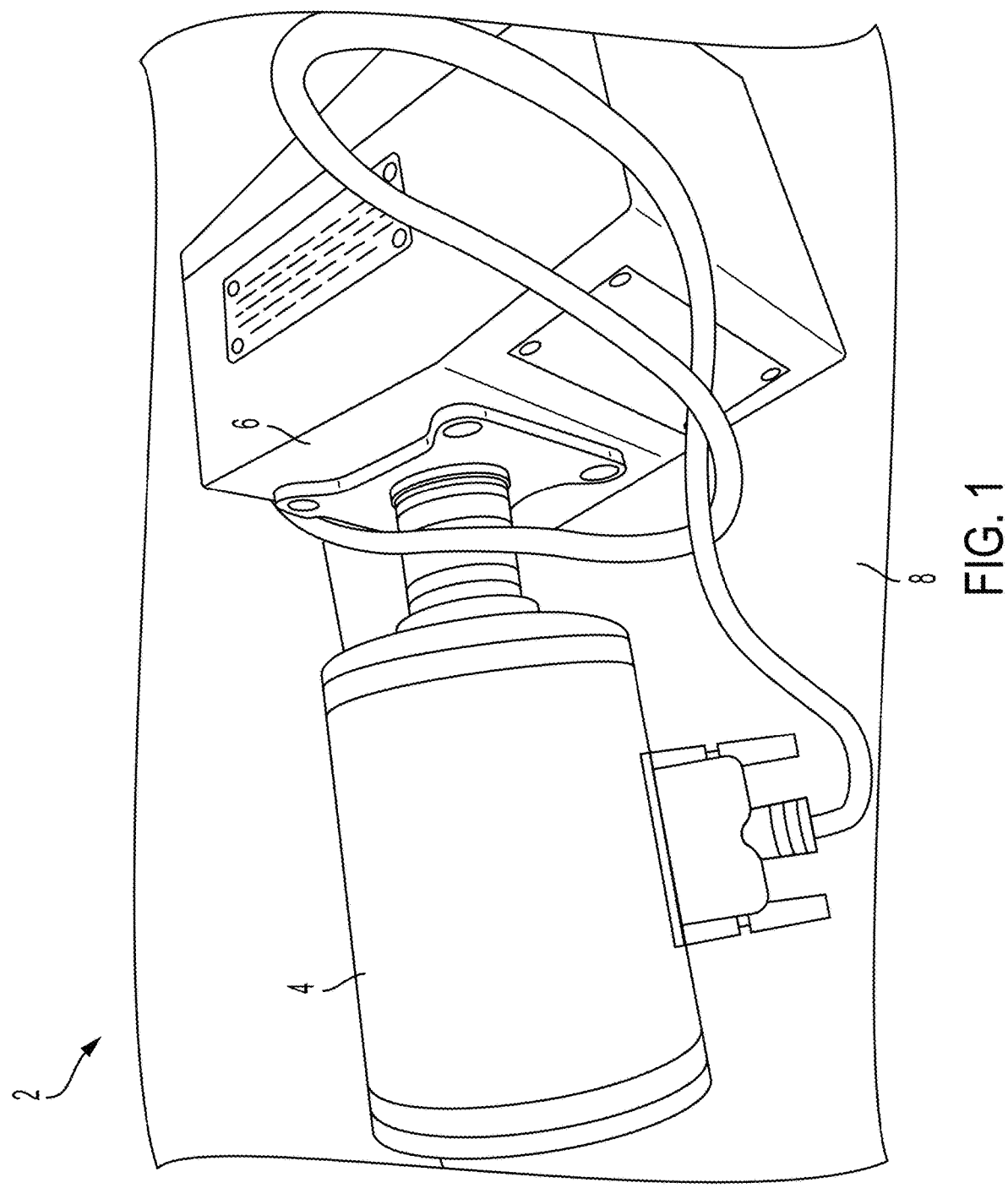
FIG. 1 illustrates an integrated sensor for detection of atmospherically scattered laser light, in accordance with various embodiments.

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

A system, apparatus, and/or method for off-axis detection of a laser source by an optical sensor connected to a processor is described as set forth herein. As briefly introduced in the background section above, the identification and localization of laser threats in a free-space channel is an increasingly important capability as active laser sensors become more widely used in civilian and military applications. Challenges arise when the laser threat is off-axis, but early identification of a laser source requires off-axis detection of laser light scattered out of the optical channel by molecules and aerosols in the free-space channel. Thus, there remains a need for the development of a sensor system for the off-axis detection of scattered laser light from a non-cooperative laser source.

This disclosure provides an image processing approach to the detection and localization of a laser in a scene. The performance of the sensor system is quantified with experiments performed inside the laboratory and in realistic daylight background conditions.

1. Introduction

Lasers have become indispensable and ubiquitous tools for high-performance communications links (in both optical fiber and free-space channels) and remote sensing technologies. In almost all application arenas, optimized detection technologies can be engineered because the optical receiver enjoys a large amount of information about the transmitting laser including laser wavelength, pointing direction, transmit time and optical pulse shape. The passive detection of non-cooperative laser sources, however, presents a new, difficult challenge. Non-cooperative laser sources will be pointed in random directions, so direct collection of radiation from the beam is highly unlikely; instead, one must rely on the collection of light scattered either from the source aperture, laser splash off of a target or the collection of light that has been scattered in the channel from atmospheric molecules and aerosols. Moreover, without prior information about the wavelength of the laser and optical pulse shape optical filtering to remove background light from the sensor, and matched filters to remove electronic noise from the receiver, implementation can be challenging.

Detection and geo-positioning of laser sources by the collection of atmospherically scattered laser light is an important sensing capability for applications such as early identification of lasers that threaten to temporarily blind pilots during the final phase of aircraft landing or identification of active laser sensors in the environment of operation. Lasers can be identified through the direct detection of Rayleigh and Mie scattering events. Rayleigh scattering is strong at short (visible) wavelengths, but rapidly degrades as the wavelength of the laser increases (toward the near infrared), as Rayleigh scattering intensity varies inversely with laser wavelength to the fourth power. At wavelengths longer than the visible, toward the near infrared (NIR), Mie scattering processes are primarily responsible for the detectable signal from atmospheric scattering.

This disclosure presents a sensor system design for the off-axis detection of scattered light from a non-cooperative laser source. The discussion includes a laboratory-scale testbed on an optical bench to directly measure laser scattering intensity as a function of scattering angle and laser wavelength. Using simulation results and data sets collected from the testbed, design and validation is performed for an image processing tool chain for detecting the presence of laser light in a scene from Mie scattering events and localizing the direction of propagation of the laser across the scene. Realistic noise environments are explored with the apparatus in a large indoor space with windows to provide a daylight environment to provide realistic noise environments in which to detect scattered light from particles. The imaging system is joined to a wavelength-tunable optical filter that can electronically scan the NIR spectrum for laser signatures. The result of the work demonstrates the detection and localization of laser beams through collection of atmospherically scattered laser light.

2. System and Experimental Design

In various embodiments, an integrated filtering/imaging system is used to make measurements of atmospheric scattering of laser light. Data collected by this sensor is used to design, construct and optimize an image processing algorithm for the detection and localization of atmospherically scattered laser light.

2.1. System Components. An example direct detection sensing system may comprise a cooled InGaAs focal plane array (FPA), a focusing lens optimized for operation in the NIR wavelength range and a narrowband optical filter with electronically tunable center wavelength. These three components may be integrated into a flexible sensor used inside and outside a laboratory environment for the detection of atmospherically scattered laser light.

In various embodiments, an example FPA used in the sensor is an PhotonEtc ZephIR 1.7s InGaAs array. An example FPA may have 15 µm×15 µm pixels in a 640×512 format. A four stage thermo-electric cooler may cool the array to-80 degrees Celsius. The digital readout may have 14 bits of precision and the camera may operate in three modes of gain (low, medium, and high). For various example implementations herein, the camera was operated in a high gain mode with a quantization of 2.1e$^-$ per analog/digital unit (ADU). Dark current for measurements was negligible as measurements were made with short integration times. The reported read noise for the camera is 30 e$^-$. The lens used in various implementations is the MVL50TM23 adjustable imaging lens from Thorlabs. The len has a 50 mm focal length, 10 cm minimum working distance and a maximum aperture f #2.8. The tunable optical filter in the sensor may be the Meadowlark TOF-NIR. The center wavelength of the filter is set electronically between 850 nm and 1976 nm with an optical bandwidth measured to be ~4 nm in an optical wavelength range of interest. While the imaging lens has a large field of view (FoV>10°), the ultimate FoV of the sensor system was limited to <6° by the filter. As illustrated in FIG. 1, these three optical components may be mounted on an optical breadboard for stability. In various embodiments, FIG. 1 illustrates an integrated sensor for detection of atmospherically scattered laser light 2. An electronically tunable optical filter 4 may be coupled to an InGaAs focal plane array 6 by a 50 mm imaging lens with components mounted on a 24"×24" optical breadboard 8 for stability.

Figure 2B:
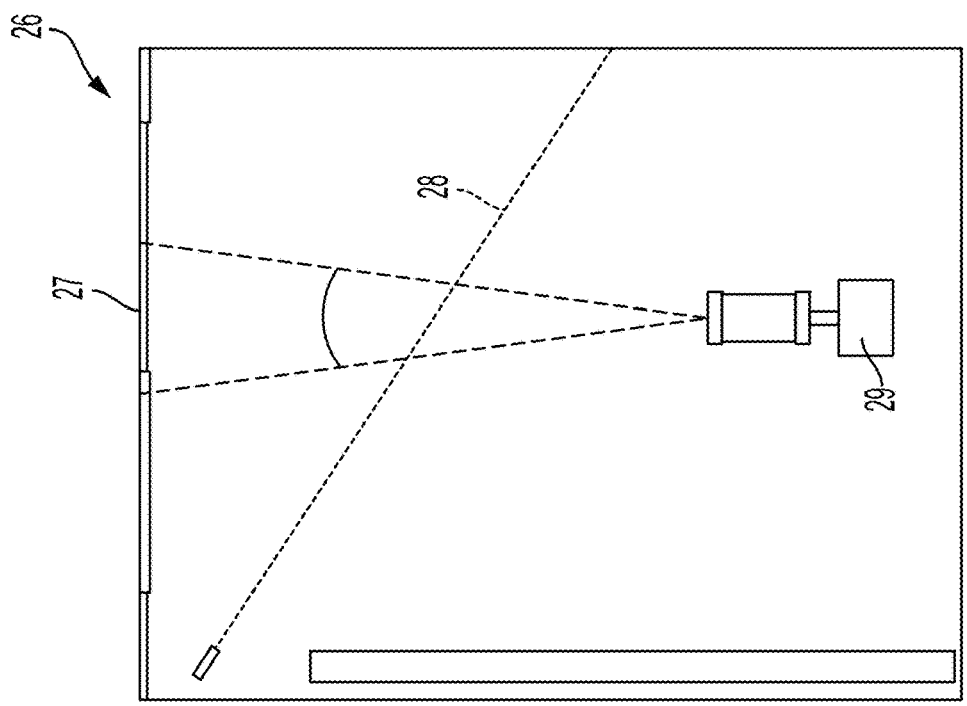
FIGS. 2A-B illustrate experimental setups for detecting laser light, in accordance with various embodiments.
Figure 2A:
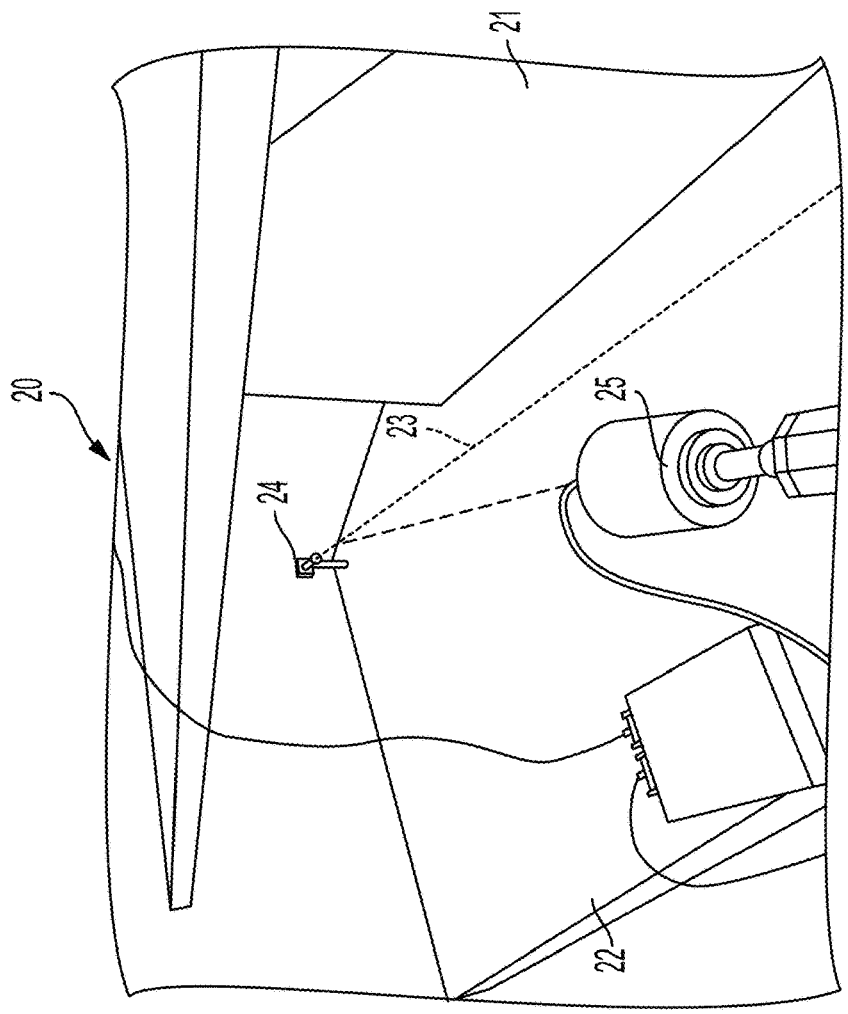

2.2 Experimental Setup. The experimental setup for measurements is shown diagrammatically in FIGS. 2A-B. With reference to FIG. 2A, an experimental setup 20 for measuring laser scattering as a function of scattering angle in a laboratory is shown. In FIG. 2B, an experimental setup 26 is illustrated for detecting and localizing laser light in the presence of daylight background conditions through a window toward which the sensor is pointed.

In FIG. 2A, laboratory measurements were performed on a 6' x 4' (1.8 m×1.2 m) optics table 22 in fluorescent lighting conditions against a black cardboard background 21. A 940 nm diode laser source generated 21 mW of optical power 23 directed across the optical table 22 to a beam dump 24. For a variety of scattering angle measurements, the camera 25 was focused on a free-space portion of the beam to detect scattering events in that region. Measurements were taken at scattering angles of 13° (41 cm from laser intercept) and 20° (81 cm from laser intercept). In FIG. 2B, the experimental setup 26 for making measurements in realistic daylight conditions is shown. The measurements were made in an office suite with fluorescent lighting against a 42 inch (106.7 cm) window and/or 36 inch (91.4 cm) opened door day-lit background 27. Measurements were taken at 20°, 30°, and 45° off-axis at a range of 3.86 meters from the region of the laser beam 28 on which the camera 29 was focused. Data was collected by the camera and passed to an image processing tool chain for laser detection and localization.

Figure 3C:
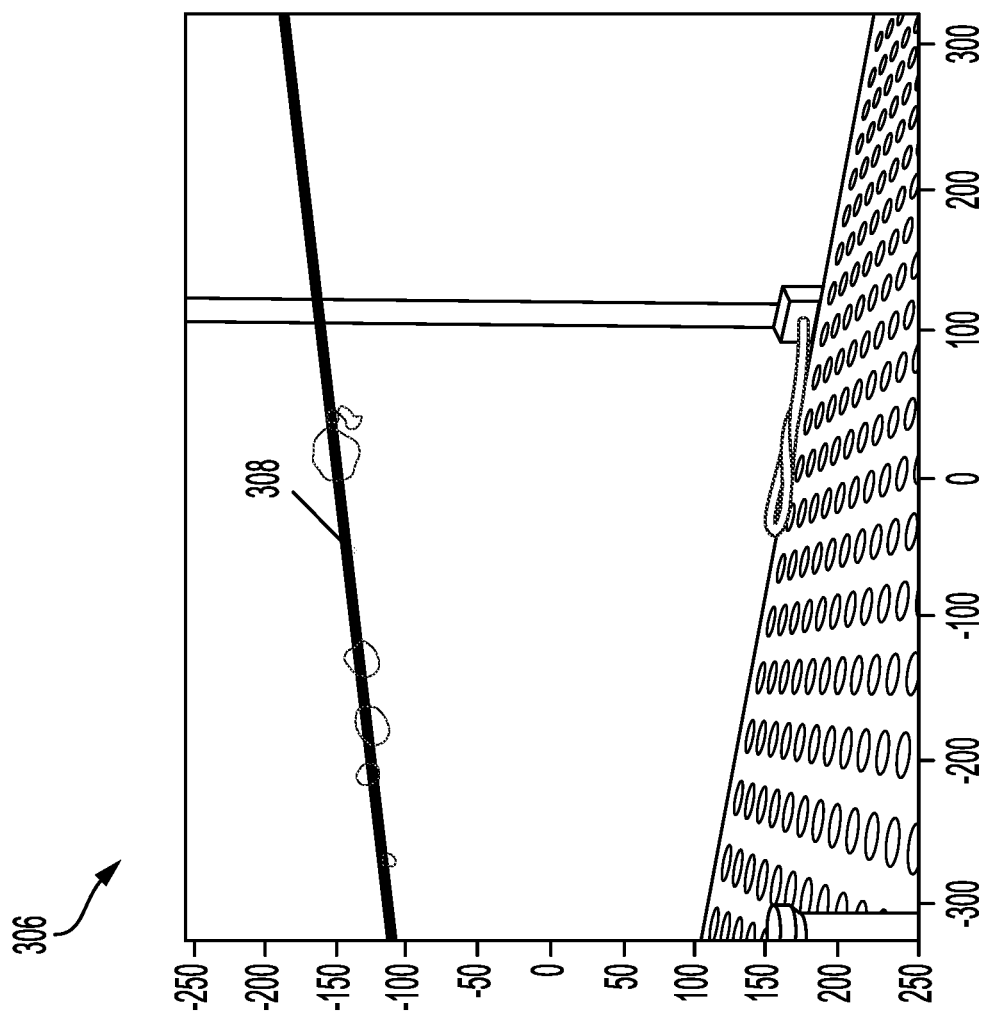
FIG. 3C illustrates an image showing that a segmented scatter image is used to estimate the location of the laser within the frame, in accordance with various embodiments.

2.3. Image Processing Chain. After images are collected by the sensor, processing is performed to detect and localize the laser within the image frame. At a high level, various steps of the image processing chain are shown in FIGS. 3A-C. FIG. 3A illustrates raw data collection 302. FIG. 3B illustrates an image 304 processed to extract Mie scattering events from the image. FIG. 3C illustrates an image 306 showing that a segmented scatter image is used to estimate the location of the laser 308 within the frame. Stated differently, after raw data is collected by the camera, the system and method first segments and extracts the Mie scattering events from the image. This segmentation is then processed using the Radon Transform to estimate the location of the laser within the image frame. Details of these two steps will be given in the following sections.

2.3.1. Mie Scattering Extraction. To detect and localize lasers using data collected by the IR camera, one may perform image processing to generate binary images that show the location of Mie scattering events within the image frame. When scattering events have been extracted from data frames, the segmented scatter images are used to estimate whether a laser is present, and to estimate the location of the laser. Laser detection and localization is performed on a stack of images. Specifically, for each estimate, a system may process the N most recently captured images, where N is a processing parameter. By processing a stack of images at once, it is possible to generate an estimate background image by averaging the entire image stack pixel-pixel. This enables performance of image processing without the need for a "ground truth" background image where it is known that there is no laser present, as was needed in previous technologies. Furthermore, it also helps to substantially reduce false detects due to environmental based variations between the background image and the data frame. For instance, even if the camera is fixed, lighting conditions can change over the course of a day, such as when the sun moves behind a cloud. If a single fixed background image is used during image processing, these variations will increase the false positive rate of a detection system. By using recently collected (e.g., data collected within the last few seconds) image frames to estimate background, the system overcomes this issue.

Steps of the image processing chain may proceed as follows. First, an estimate of the background may be generated by averaging the image stack pixel-by-pixel. Using the background estimate, for each frame in the stack, background subtraction may be formed and image thresholding applied. Finally, the image may be binarized using Otsu's method. After binarization, the only portions of the image with pixel value of 1 in the binary image are the regions with scattering events.

After each frame in the image stack is processed, the complete set of binary images may then be summed together. This enables the system to combine all of the scattering events into a single image. There are typically only a few (e.g., one or two) scattering events captured in a single frame, but as the number of images in the stack used is increased, the number of independent scattering events captured is also increased. However, it is possible for there to be structures in the binary image not generated by Mie scattering events. For instance, experimental data shows that very small structures can be generated by pixel noise that made it through the processing steps, while larger structures can potentially be generated by variations in light sources that are not the laser, such as light from the sun moving behind a branch on a windy day. Because the image processing chain is designed to extract variations in individual image frames from an estimated background image, it is possible that these variations will make it through the binarization step.

To account for these structures in the binary image, morphological processing is implemented, making use of algorithms designed specifically for operation on binary images. In the image processing chain, a filter is used that searches through the binary image and removes any structures with five or fewer fully connected pixels, or greater than 20 fully connected pixels. It has been determined that nearly all Mie scattering events captured by the IR camera fall within this range and are therefore not removed by the filter.

Representative final output of the imaging chain after processing the stack of images is seen in FIG. 4C, which depicts a binary image 406 showing locations of all detected Mie scattering events found after image processing. For cases where there is no laser present, the output of the image processing chain is an empty image field (e.g., a data frame consisting of all 0s). Regardless, these final processed frames are then used to determine whether a laser is present in the field-of-view of the camera, and if so, to estimate location of the laser within the image frame. With reference to FIGS. 4A-C, various images of representative data collected by the system are illustrated. FIG. 4A depicts an image 402 showing an unprocessed frame with two Mie scattering events identified. FIG. 4B shows an image 404 depicting results after processing the raw image. As seen, nearly the entire image is empty except for the two scattering events, which have been extracted from the image frame. FIG. 4C illustrates an image 406 that shows a sample result from processing 20 frames and then summing generated binary images together. There is a clear collection of Mie scattering events along the location of the laser within the image frame. This final processed image is then used for detection and laser localization.

Figure 5:
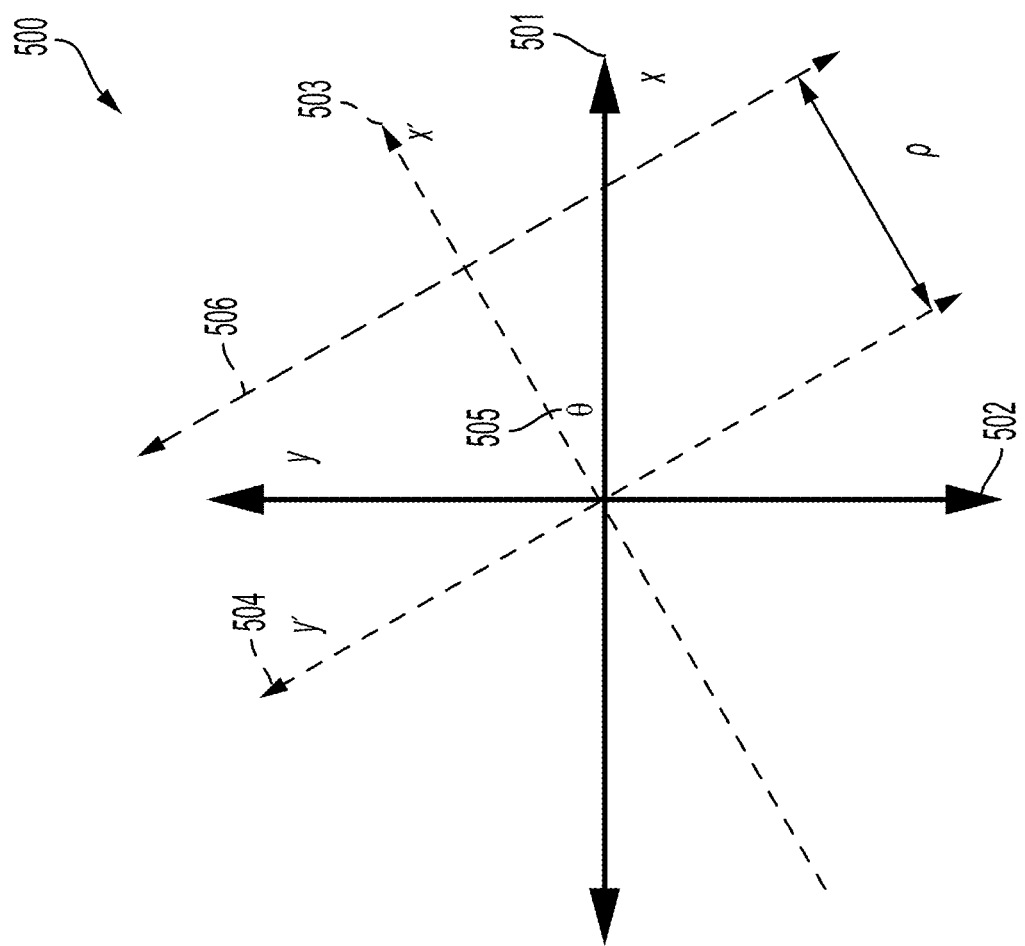
FIG. 5 illustrates geometry of a Radon Transform, in accordance with various embodiments.

2.3.2 Laser Localization. After scattering events have been extracted from the stack of frames, the location of the laser is estimated using the Radon Transform. The Radon Transform of f(x, y) is defined as $$R(\rho,\theta)=\iint f(x,y)\delta(\rho-x\cos\theta-y\sin\theta)dxdy \quad (1)$$

where $\rho=x\cos\theta+y\sin\theta$. The geometry of the transform is shown graphically in FIG. 5. Starting with a standard cartesian coordinate system 500 with axes x 501 and y 502, a secondary set of axes x' 503 and y' 504 can be defined by rotating axes x and y by angle $\theta$ 505. Then, for each point $R(\rho, \theta)$, a line integral through f(x, y) can be taken along a line 506 that is parallel to axis y' and intercepts axis x' at point $\rho$. The integral path is shown in FIG. 5 as a dashed line 506. Taking the line integral of across f(x, y) through this line corresponds to a single point $R(\rho, \theta)$ of the Radon Transform of f(x, y). The complete Radon Transform of f(x, y) is taken by sweeping $\rho$ from $-\infty$ to $\infty$, while sweeping $\theta$ from 0 to 180 degrees. The Radon Transform has many applications, especially in the medical imaging field. Here, the system and method uses it for line detection.

A rationale for using the Radon Transform for line detection is as follows: Imagine a binary image with a single line passing through an otherwise empty background. When the Radon Transform of this image is taken, it is clear that the maximum value of the transform will be obtained when the line integral path passes directly through the line. This principle may be used as a means to estimate the location of the laser within the image frame. After calculation of the Radon Transform, the peak of the Radon Transform can be used to determine the line integral path used to obtain the point. The line integral path is then used as an estimate for the location of the laser within the image frame. Of course, as shown in FIGS. 4A-C, which shows the impact of each processing step of the localization algorithm on raw sensor data, the image frames that are collected are noisy and do not have a single ideal line passing through them. Therefore, the purpose the image processing chain is to make the raw frame data more suitable for line detection using the Radon Transform. As will be shown, after extraction of Mie scattering events from raw data, there is sufficient information to use the Radon Transform to estimate the path of the laser.

Figure 6A:
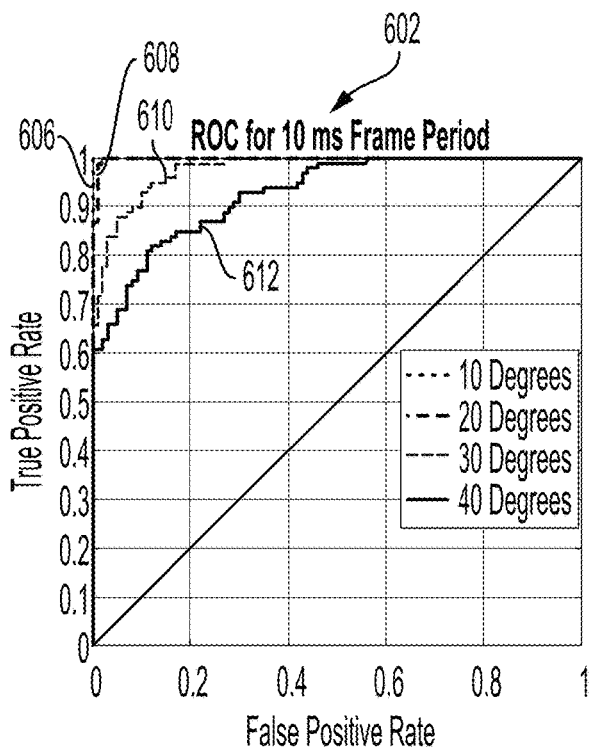
FIGS. 6A-D illustrate detection results, in accordance with various embodiments.
Figure 6B:
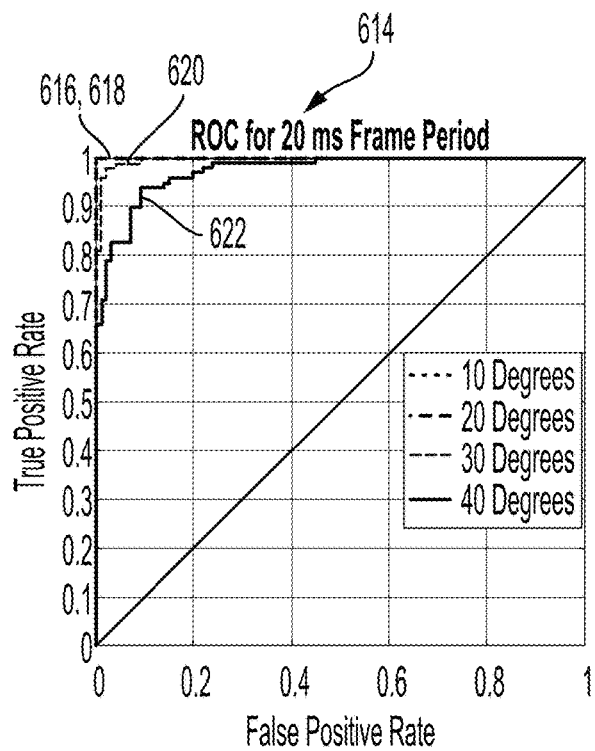
Figure 6C:
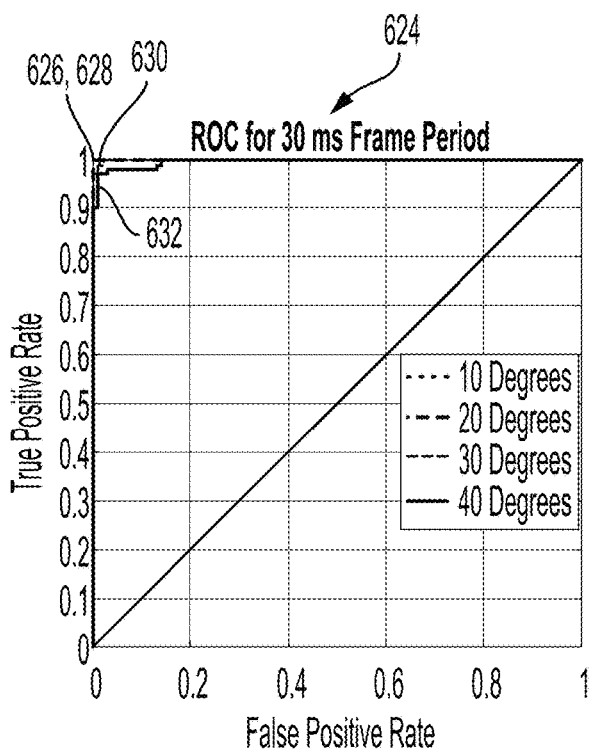
Figure 6D:
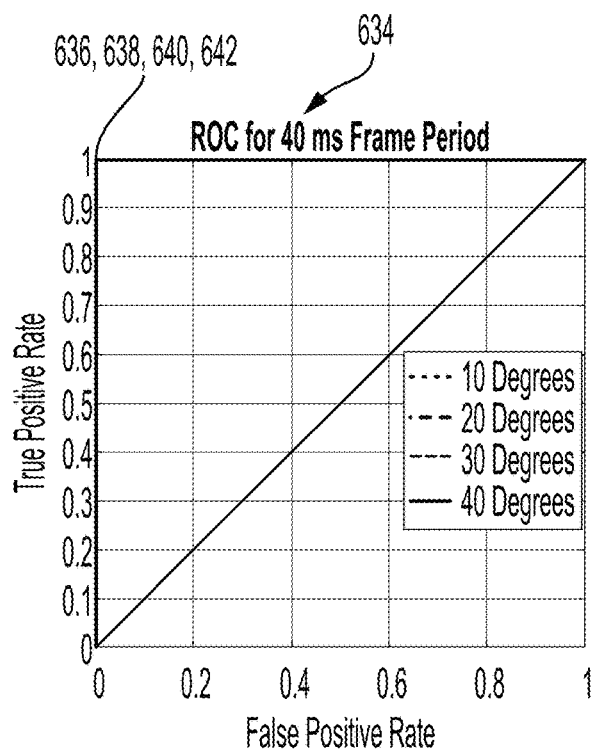

3. Experimental Results 3.1. Detection experiments in lab. To evaluate this approach, image frames were collected at different angular configurations at a range of acquisition times and were processed. Detection results from this experiment are shown in FIGS. 6A-D. As seen, with 40 ms acquisition time or higher, the system is able to detect the presence of a laser up to 40° off axis from with 100% accuracy. More specifically, FIG. 6A illustrates a chart 602 comparing true positive rate and false positive rate for a 10 ms frame period for a laser 10 degrees 606, 20 degrees 608, 30 degrees 610, and 40 degrees 612 off axis. FIG. 6B illustrates a chart 614 comparing true positive rate and false positive rate for a 20 ms frame period for a laser 10 degrees 616, 20 degrees 618, 30 degrees 620, and 40 degrees 622 off axis. FIG. 6C illustrates a chart 624 comparing true positive rate and false positive rate for a 30 ms frame period for a laser 10 degrees 626, 20 degrees 628, 30 degrees 630, and 40 degrees 632 off axis. FIG. 6D illustrates a chart 634 comparing true positive rate and false positive rate for a 40 ms frame period for a laser 10 degrees 636, 20 degrees 638, 30 degrees 640, and 40 degrees 642 off axis.

3.2 Wavelength scanning experiments. FIGS. 7A-K and 8A-B show results from experiments where the optical filter was swept between 935 nm and 945 nm while the system was in the presence of a 940 nm laser. Sample processed images are shown in FIGS. 7A-K, which shows extracted scattering events from data collected at each filter setting. FIG. 7A shows an illustration 702 of scatter locations with a filter wavelength of 935 nm. FIG. 7B shows an illustration 704 of scatter locations with a filter wavelength of 936 nm. FIG. 7C shows an illustration 706 of scatter locations with a filter wavelength of 937 nm. FIG. 7D shows an illustration 708 of scatter locations with a filter wavelength of 938 nm. FIG. 7E shows an illustration 710 of scatter locations with a filter wavelength of 939 nm. FIG. 7F shows an illustration 712 of scatter locations with a filter wavelength of 940 nm. FIG. 7G shows an illustration 714 of scatter locations with a filter wavelength of 941 nm. FIG. 7H shows an illustration 716 of scatter locations with a filter wavelength of 942 nm. FIG. 7I shows an illustration 718 of scatter locations with a filter wavelength of 943 nm. FIG. 7J shows an illustration 720 of scatter locations with a filter wavelength of 944 nm. FIG. 7K shows an illustration 722 of scatter locations with a filter wavelength of 945 nm.

Figure 8B:
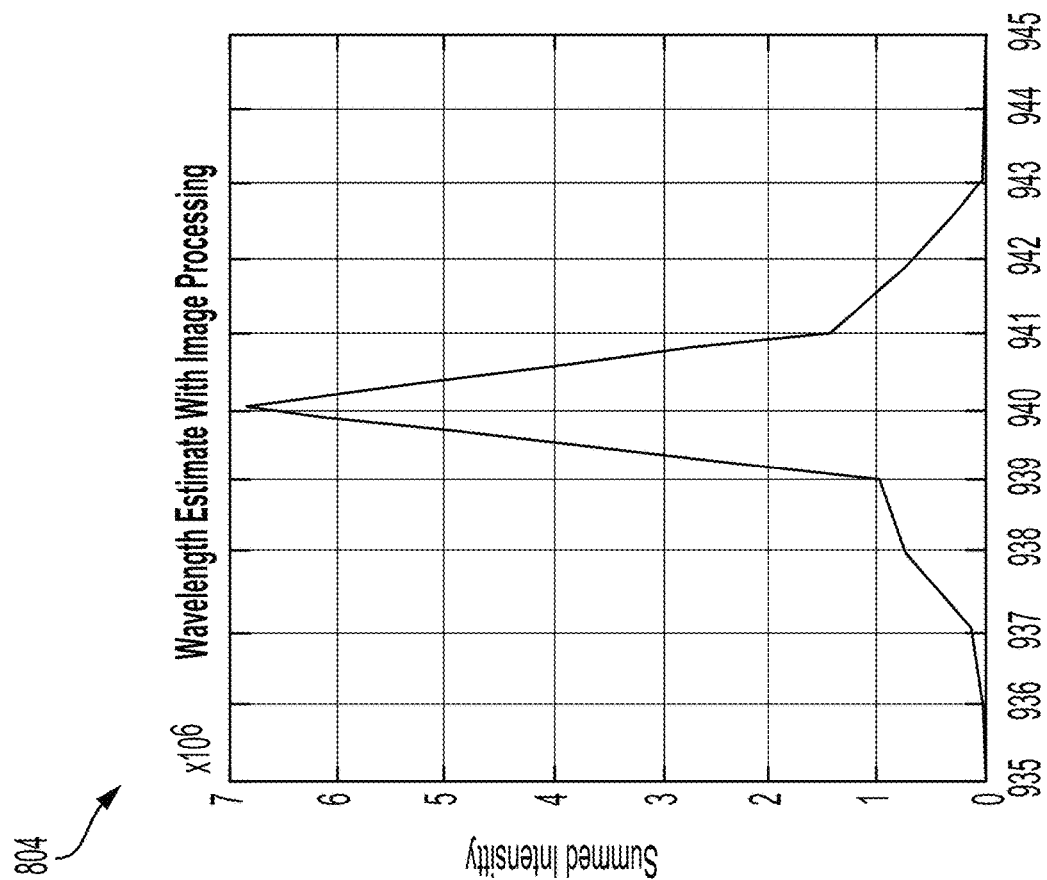
FIGS. 8A-B show summation of image intensity from data collected at each wavelength with and without utilization of the image processing chain, in accordance with various embodiments.
Figure 8A:
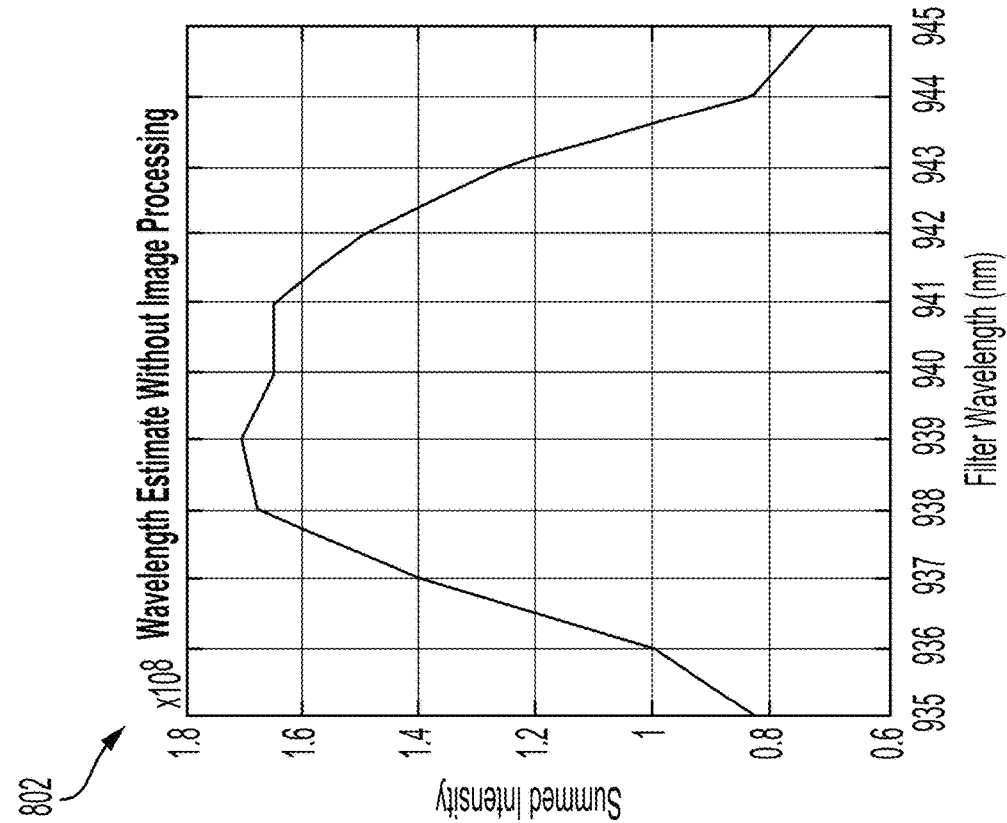

As seen, the amount of scatter extracted is maximized when the optical filter is tuned to match the laser wavelength. This suggests that a system can use Mie scattering events to accurately estimate laser wavelength using processed imagery collected with tunable optical filter. This is illustrated in FIGS. 8A-B, which shows summation of image intensity from data collected at each wavelength with and without utilization of the image processing chain. FIG. 8A depicts a graph 802 of data illustrating that without the image processing chain, there is a broad peak between data collected with the filter set between 937 nm and 941 nm. However, FIG. 8B depicts a graph 804 of data illustrating that when image intensity is summed after applying the processing chain to extract scattering events, there is a clear peak in intensity at 940 nm.

Figure 9B:
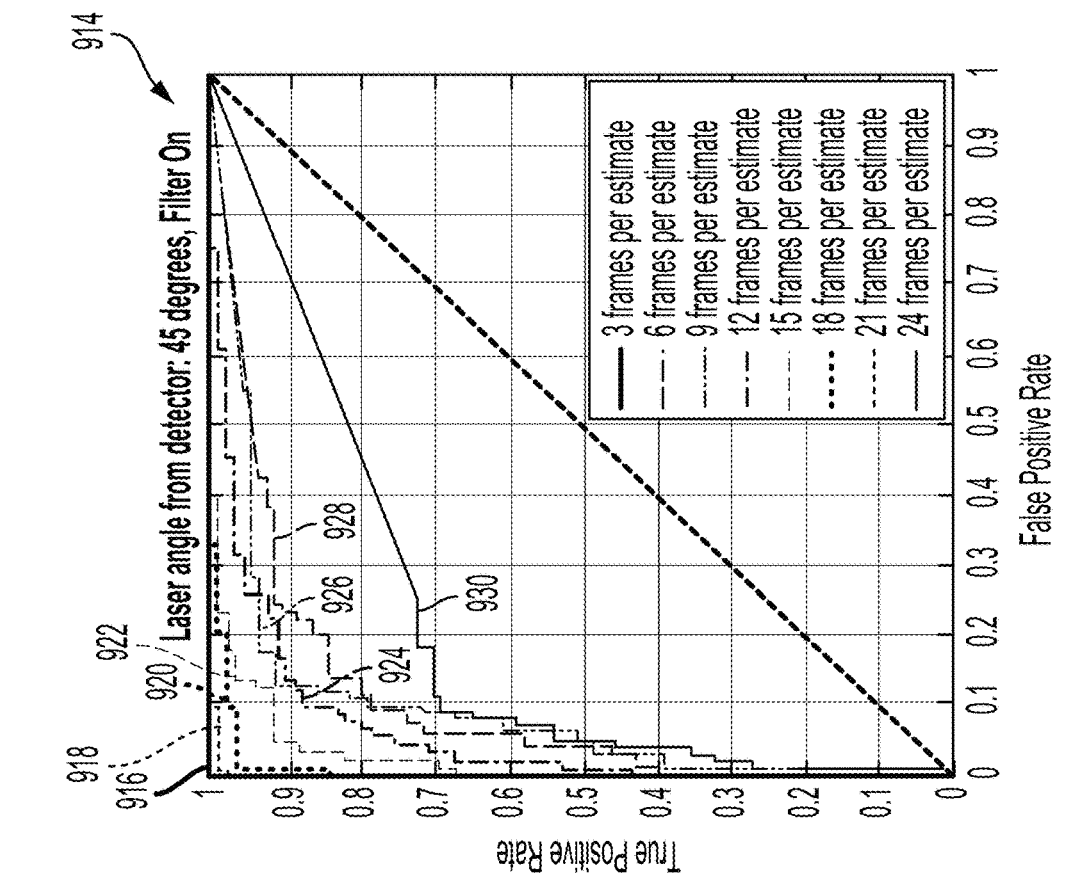
FIG. 9B illustrates rates of true positive and false positive laser detection with different numbers of frames when a laser is oriented 45-degrees from a camera, in accordance with various embodiments.
Figure 9A:
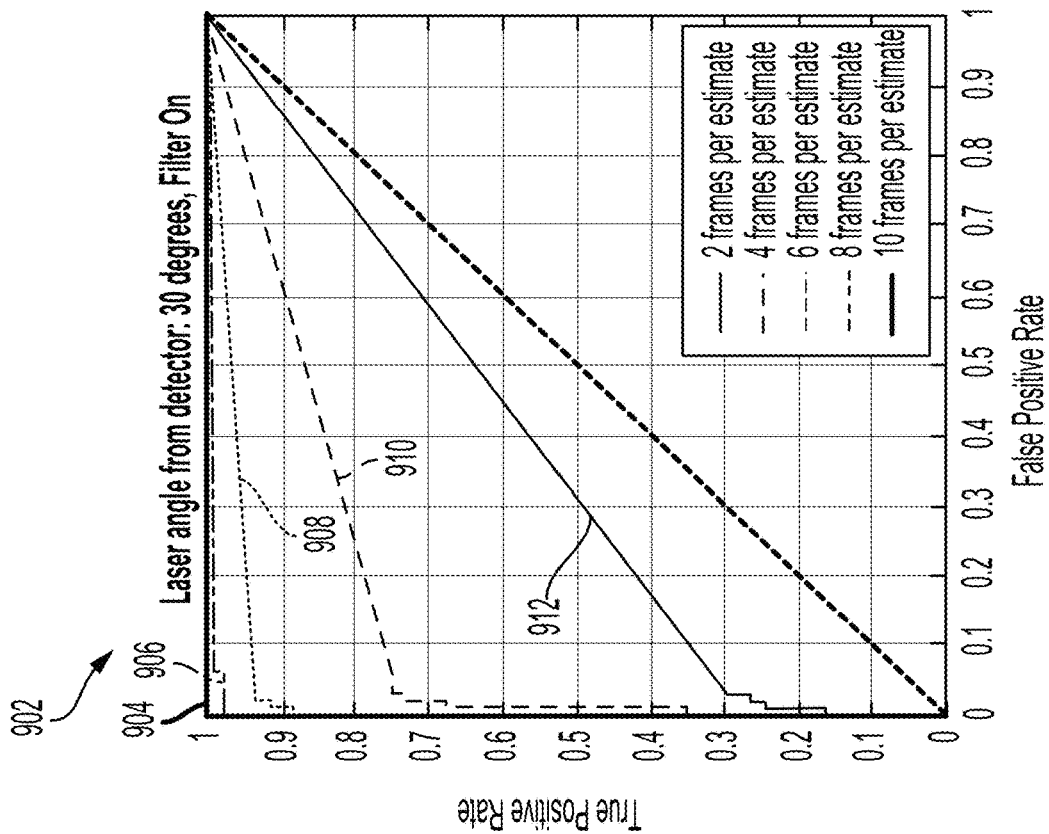
FIG. 9A illustrates rates of true positive and false positive laser detection with different numbers of frames when a laser is oriented 30-degrees from a camera, in accordance with various embodiments.

3.3. Detection experiments in ambient light. To evaluate the performance of the system and image processing chain in a realistic operating environment, datasets consisting of 100 frames with 100 ms exposure time each were collected when the laser was oriented 20°, 30°, and 45° from the camera in front of an open window, which provided realistic daylight background lighting conditions. For the 30° and 45° datasets, there were also 100 frames collected in the exact same configuration but with the laser deactivated. With these two datasets, ROC curves were generated to determine the image stack size needed for accurate laser detection. FIG. 9A is an illustration 902 that shows that when the laser was oriented 30° from the camera, the system was able to accurately detect the laser with 100% true positive rate and 0% false positive rate when processing stacks with 10 frames or greater (corresponding to 1 s of data collection time). FIG. 9A shows a variety of curves. For instance, a curve 904 for 10 frames per estimation is shown, a curve 906 for 8 frames per estimation is shown, a curve 908 for 6 frames per estimation is shown, a curve 910 for 4 frames per estimation is shown, and a curve 912 for 2 frames per estimation is shown. Similarly, when the laser was oriented 45° from the camera, as shown in the illustration 914 of FIG. 9B, the system obtained 100% true positive rate and 0% false positive rate for image stacks with 24 frames or greater (corresponding to 2.4 s of data collection time). FIG. 9B shows a variety of curves. For instance, a curve 916 for 24 frames per estimation is shown, a curve 918 for 21 frames per estimation is shown, a curve 920 for 18 frames per estimation is shown, a curve 922 for 15 frames per estimation is shown, a curve 924 for 12 frames per estimation is shown, a curve 926 for 9 frames per estimation is shown a curve 928 for 6 frames per estimation is shown, and a curve 930 for 3 frames per estimation is shown. The increase in image stack size is due to the fact that as the laser is angled farther from the camera, the system detects fewer Mie scattering events per image frame.

4. Discussion and Conclusions

The experiments presented in this work demonstrate the feasibility of passive, off-axis detection of a noncooperative laser source from light collected from scattering processes in the atmospheric channel. A direct detection system was disclosed, comprising a sensitive InGaAs focal plane array and an electrically tunable optical filter both engineered for operation in the NIR wavelength range. An image processing algorithm was developed to take sets of image frames and, in post-processing, determine if a laser is present crossing the field of view of the camera, and the location of the laser beam crossing the scene. In a laboratory experiment, the receiver operating characteristic (ROC) curves were measured for detection of the laser beam as a function of scattering angle for the laser light. In an experiment conducted outside of the laboratory, the sensor was subjected to realistic daylight background noise conditions and demonstrated that, with the optical altering capabilities, the sensor can detect scattered laser light even in the presence of daylight conditions.

FIGS. 10A-D provides illustrations showing laser localization for a 20-degree dataset for various image stack sizes. The lines in the figures show location estimate for 5, 10, 15, or 20 frames, while the heaviest and central line generally horizontally across the frame corresponds to a location estimate for 100 frames. More specifically, FIG. 10A provides an illustration 1002 showing laser localization for a 20-degree dataset for an image stack size of 5. FIG. 10B provides an illustration 1004 showing laser localization for a 20-degree dataset for an image stack size of 10. FIG. 10C provides an illustration 1006 showing laser localization for a 20-degree dataset for an image stack size of 15. FIG. 10D provides an illustration 1008 showing laser localization for a 20-degree dataset for an image stack size of 20.

Figures 11C, 11D:
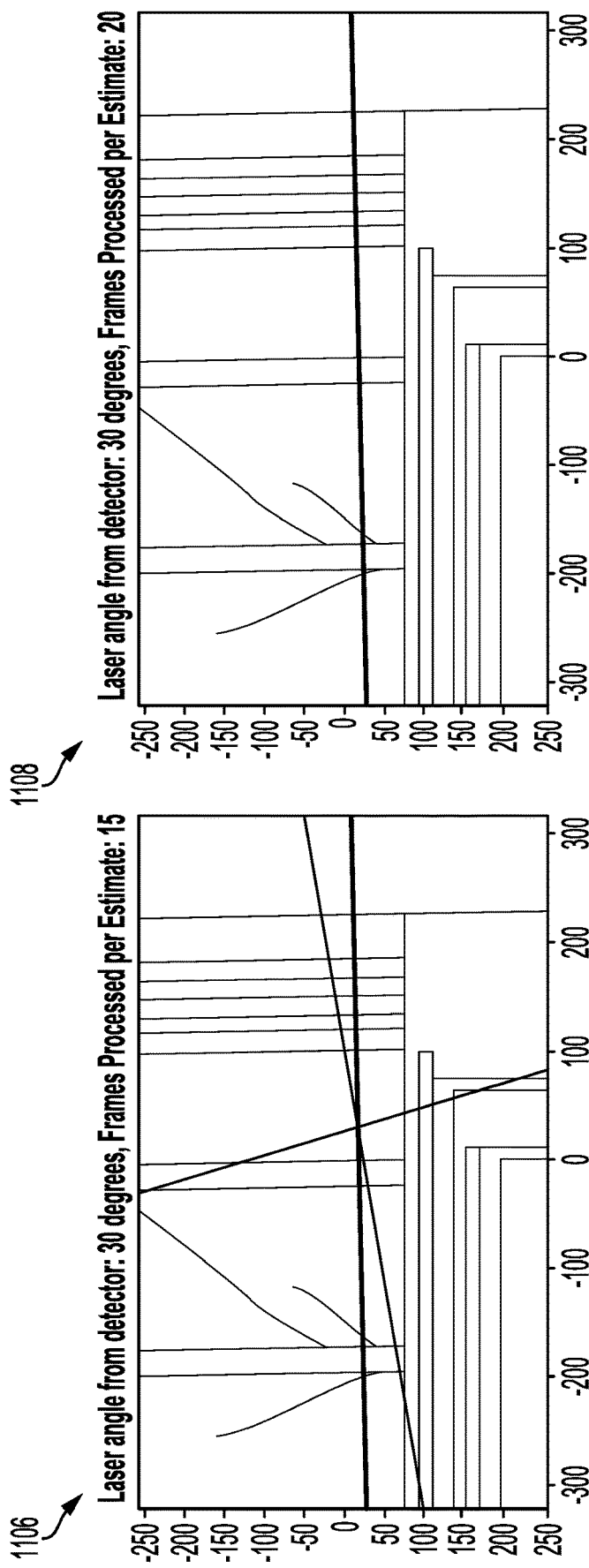

FIGS. 11A-D provides illustrations showing laser localization for a 30-degree dataset for various image stack sizes. The lines in the figures show location estimate for 5, 10, 15, or 20 frames, while the heaviest and central line generally horizontally across the frame corresponds to a location estimate for 100 frames. More specifically, FIG. 11A provides an illustration 1102 showing laser localization for a 30-degree dataset for an image stack size of 5. FIG. 11B provides an illustration 1104 showing laser localization for a 30-degree dataset for an image stack size of 10. FIG. 11C provides an illustration 1106 showing laser localization for a 30-degree dataset for an image stack size of 15. FIG. 11D provides an illustration 1108 showing laser localization for a 30-degree dataset for an image stack size of 20.

FIGS. 12A-D provides illustrations showing laser localization for a 45-degree dataset for various image stack sizes. The lines in the figures show location estimate for 5, 10, 15, or 20 frames, while the heaviest and central line generally horizontally across the frame corresponds to a location estimate for 100 frames. More specifically, FIG. 12A provides an illustration 1202 showing laser localization for a 45-degree dataset for an image stack size of 5. FIG. 12B provides an illustration 1204 showing laser localization for a 45-degree dataset for an image stack size of 10. FIG. 12C provides an illustration 1206 showing laser localization for a 45-degree dataset for an image stack size of 15. FIG. 12D provides an illustration 1208 showing laser localization for a 45-degree dataset for an image stack size of 20.

The experiments described in this paper were performed using laboratory-scale laser powers (milliwatt class lasers) and on scales that fit within the laboratory, or within the indoor space in which the experiments were conducted. However, in various embodiments, other configurations are possible. For instance, in various embodiments, the experiments may be in an outdoor setting where realistic ranges (towards 1 km) and laser powers (toward 1 watt) are be evaluated. Moreover, the indoor experiments conducted depended on laser light interacting with scattering particles which are naturally present in the air. In various indoor environments, filtered air handling systems reduce the number of particles available in the air for Mie scattering, as well as the velocity of those particles. In various embodiments, such as an outdoor environment, the system may include a realistic free-space optical channel scattering environment.

In various embodiments, the electrically-tunable optical filter offers a unique capability to scan a broad optical spectrum looking for scattered laser light while filtering out ambient background noise. However, for some filters, a scan rate of the filter is slow with a settling time of 100 ms. Scanning over 100's of nanometers of optical bandwidth would take many seconds of integration time. Additionally, the architecture for the filter may provide a limited instantaneous field of view for the sensor system (~6°). Mitigating this limitation to achieve omni-presence may include, in various embodiments, spatial multi-plexing or scanning. In various embodiments, there would be immense value in implementing electronically tunable wavelength filters with wide field of view and fast scanning rates that can match the fundamental performance of the camera and image processing algorithms to detect the presence of laser light scattered in an atmospheric channel.

Figure 13:
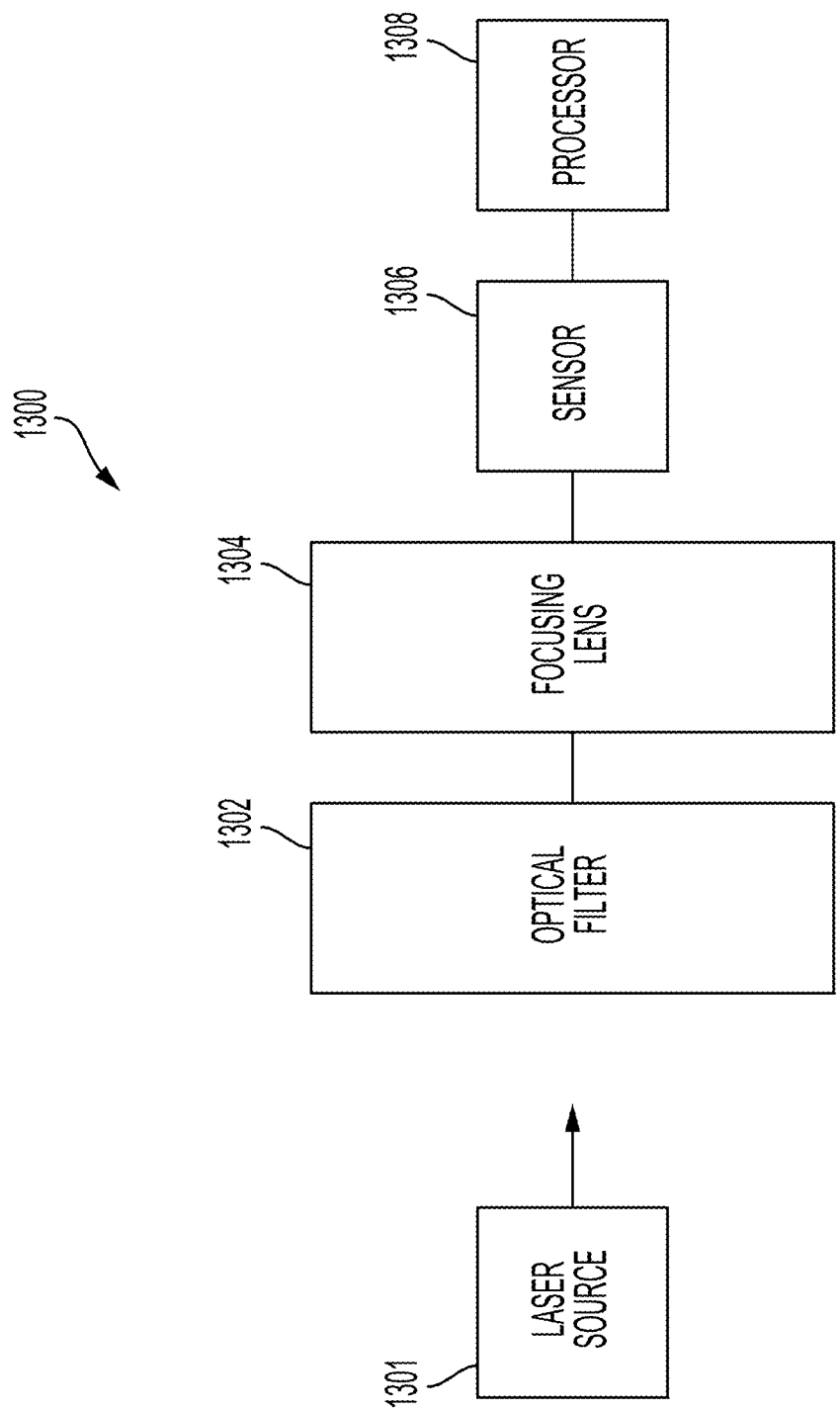
FIG. 13 illustrates an example diagram of one example embodiment of a system for off-axis detection of a laser source, in accordance with various embodiments.

Turning now to FIG. 13, an example diagram of one example embodiment of the system 1302 disclosed herein is now depicted. A system 1300 for off-axis detection of a laser source 1301 may include an optical sensor 1306. The optical sensor 1306 may be one of the sensors discussed herein, or another sensor as desired. The optical sensor 1306 may be configured to detect light. The system 1300 may include a focusing lens 1304. The focusing lens 1304 may be one of the focusing lenses discussed herein, or another lens as desired. The focusing lens 1304 may be adjacent to an input of the optical sensor 1306 and configured to focus the light. The system 1300 may include an optical filter 1302 adjacent to an input of the focusing lens 1304 and configured to filter a wavelength of the light. The system 1300 may include a processor 1308. The processor 1308 may be a computer, an application-specific integrated circuit (ASIC), a field-programmable gate array (FPGA), a graphics processing unit (GPU) or any other processor as desired. The processor 1308 may be connected to the optical sensor 1306 and configured to analyze data from the optical sensor 1306 to detect atmospheric scattering of laser light from the laser source 1301.

One or more other aspects may also be provided. The optical filter 1302 may be electronically tunable and may have a tunable center wavelength. The focusing lens 1304 may be optimized for a near infrared wavelength. The optical sensor 1306 may be a focal plane array. The focal plane array may be a cooled InGaAs focal plane array configured to capture Mie scattering events caused by the laser source interacting with atmospheric dust particles.

Figure 14:
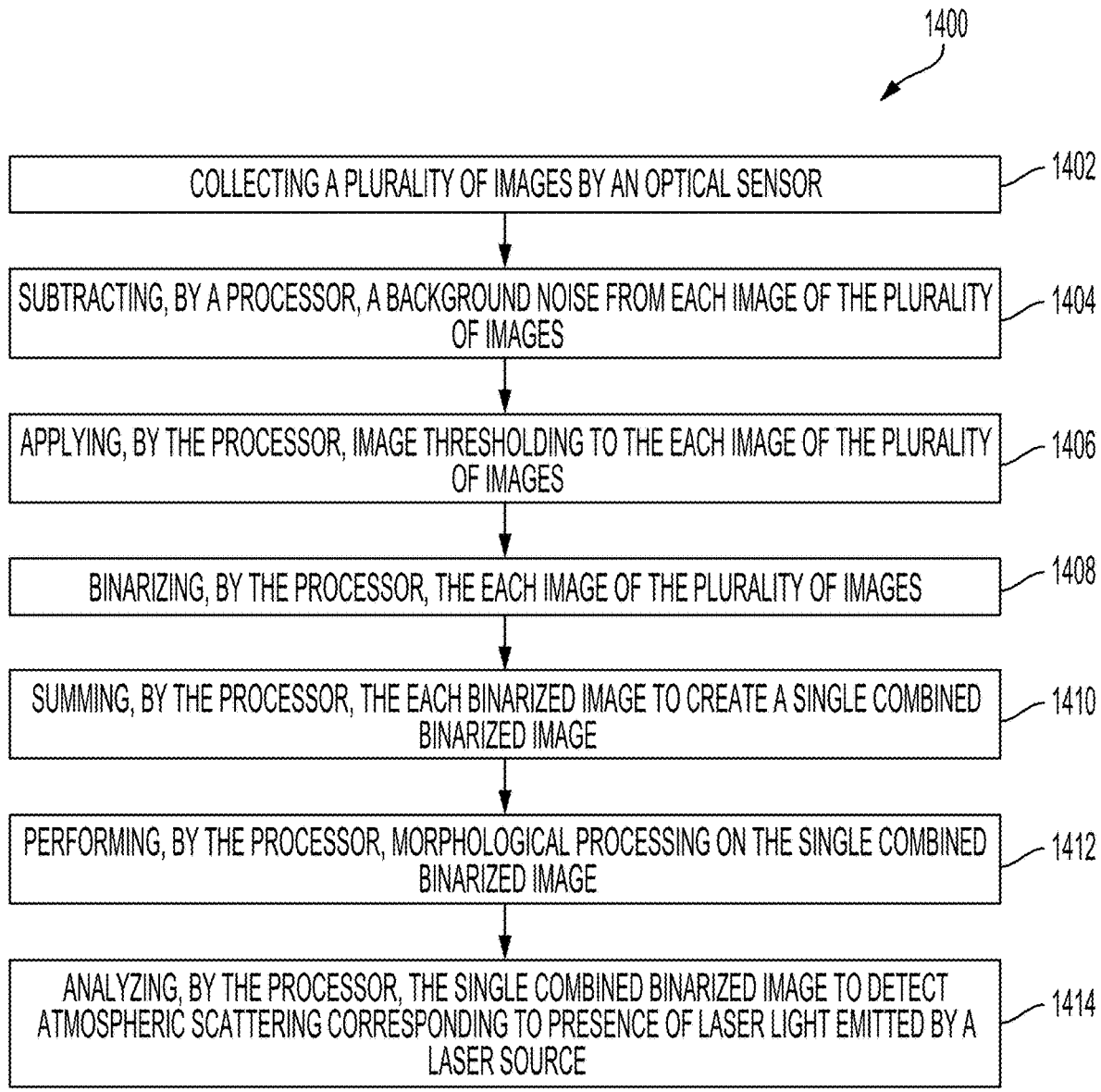
FIG. 14 illustrates an example method for off-axis detection of a laser source, in accordance with various embodiments.

Turning now to FIG. 14, a method 1400 is provided. Specifically, a method for off-axis detection of a laser source by an optical sensor connected to a processor is provided. Consistently with the discussion in the prior paragraphs, various embodiments of the method may include collecting a plurality of images by the optical sensor (block 1402). The method may include subtracting, by the processor, a background noise from each image of the plurality of images (block 1404). The method may include applying, by the processor, image thresholding to each image of the plurality of images (block 1406). The method may include binarizing, by the processor, each image of the plurality of images (block 1408). Further aspects may include summing, by the processor, the each binarized image to create a single combined binarized image (block 1410). In various embodiments, the processor performs morphological processing on the single combined binarized image (block 1412). Furthermore, the processor may analyze the single combined binarized image to detect atmospheric scattering corresponding to presence of laser light emitted by the laser source (block 1414). The morphological processing may at least one of (i) reduce noise and (ii) remove unwanted structures in the single combined binarized image.

The method may include other aspects as well. For example, subtracting the background noise may include averaging at least one image of the plurality of images pixel-by-pixel to generate an average background data mask and subtracting for each image of the plurality of images the average background data mask from each image. The binarizing each image may cause only portions of the each image corresponding to the atmospheric scattering to have a binary value of 1 and other portions of the each image to have the binary value of 0. The summing the binarized images may cause the atmospheric scattering corresponding to the presence of laser light to be combined in the single combined binarized image. The morphological processing may include deleting any structures with (a) five or fewer fully connected pixels or (b) greater than 20 fully connected pixels. Moreover, the atmospheric scattering may comprise Mie scattering or Rayleigh scattering.

In various instances, the method includes taking a Radon transform of the single combined binarized image to identify a first location estimate of a path of the laser light in the single combined binarized image. In various instances, the binarizing each image includes applying Otsu's method to each image. The method may contemplate tuning a center wavelength of an optical filter adjacent to the optical sensor, wherein the center wavelength is tuned to approximately a wavelength of the laser light emitted by the laser source. In various embodiments, the method includes tuning a center wavelength of an optical filter adjacent to the optical sensor to different center wavelengths and comparing a measured intensity of the detected atmospheric scattering at the different center wavelengths to determine the center wavelength associated with a peak of the measured intensity. The center wavelength may be associated with the peak of the measured intensity corresponding to a wavelength of the laser light emitted by the laser source. The center wavelength of the optical filter may be tunable between 850 nm and 1976 nm.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for off-axis detection of a laser source by an optical sensor connected to a processor, the method comprising:
   collecting a plurality of images by the optical sensor;
   subtracting, by the processor, a background noise from each image of the plurality of images;
   applying, by the processor, image thresholding to the each image of the plurality of images;
   binarizing, by the processor, the each image of the plurality of images;
   summing, by the processor, the each binarized image to create a single combined binarized image;
   performing, by the processor, morphological processing on the single combined binarized image, wherein the morphological processing at least one of (i) reduces noise or (ii) removes unwanted structures in the single combined binarized image;
   analyzing, by the processor, the single combined binarized image to detect atmospheric scattering corresponding to the presence of laser light emitted by the laser source;
   tuning a center wavelength of an optical filter adjacent to the optical sensor to different center wavelengths; and
   comparing a measured intensity of the detected atmospheric scattering at the different center wavelengths to determine the center wavelength associated with a peak of the measured intensity, wherein the center wavelength associated with the peak of the measured intensity corresponds to a wavelength of the laser light emitted by the laser source.

2. The method for off-axis detection of laser sources according to claim 1, wherein subtracting the background noise further comprises averaging at least one image of the plurality of images pixel-by-pixel to generate an average background data mask and subtracting for each image of the plurality of images the average background data mask from the each image.

3. The method for off-axis detection of laser sources according to claim 1, wherein the binarizing the each image causes only portions of the each image corresponding to the atmospheric scattering to have a binary value of 1 and other portions of the each image to have the binary value of 0.

4. The method for off-axis detection of laser sources according to claim 1, wherein the summing the binarized images causes the atmospheric scattering corresponding to the presence of laser light to be combined in the single combined binarized image.

5. The method for off-axis detection of laser sources according to claim 1, wherein the morphological processing comprises deleting any structures with (a) five or fewer fully connected pixels or (b) greater than 20 fully connected pixels.

6. The method for off-axis detection of laser sources according to claim 1, wherein the atmospheric scattering comprises Mie scattering or Rayleigh scattering.

7. The method for off-axis detection of laser sources according to claim 1, the method further comprising taking a Radon transform of the single combined binarized image to identify a first location estimate of a path of the laser light in the single combined binarized image.

8. The method for off-axis detection of laser sources according to claim 1, wherein the binarizing the each image comprises applying Otsu's method to the each image.

9. The method for off-axis detection of laser sources according to claim 1, wherein the center wavelength of the optical filter is tunable between 850 nm and 1976 nm.

10. A method for off-axis detection of a laser source by an optical sensor connected to a processor, the method comprising:
    collecting a plurality of images by the optical sensor;
    subtracting, by the processor, a background noise from each image of the plurality of images;
    binarizing, by the processor, the each image of the plurality of images;
    summing, by the processor, the each binarized image to create a single combined binarized image;
    analyzing, by the processor, the single combined binarized image to detect atmospheric scattering corresponding to the presence of laser light emitted by the laser source;
    tuning a center wavelength of an optical filter adjacent to the optical sensor to different center wavelengths; and
    comparing a measured intensity of the detected atmospheric scattering at the different center wavelengths to determine the center wavelength associated with a peak of the measured intensity, wherein the center wavelength associated with the peak of the measured intensity corresponds to a wavelength of the laser light emitted by the laser source.

11. The method for off-axis detection of laser sources according to claim 10, wherein subtracting the background noise further comprises averaging at least one image of the plurality of images pixel-by-pixel to generate an average background data mask and subtracting for each image of the plurality of images the average background data mask from the each image.

12. The method for off-axis detection of laser sources according to claim 10, wherein the binarizing the each image causes only portions of the each image corresponding to the atmospheric scattering to have a binary value of 1 and other portions of the each image to have the binary value of 0.

13. The method for off-axis detection of laser sources according to claim 10, wherein the summing the binarized images causes the atmospheric scattering corresponding to the presence of laser light to be combined in the single combined binarized image.

14. The method for off-axis detection of laser sources according to claim 10, wherein the atmospheric scattering comprises Mie scattering or Rayleigh scattering.

15. The method for off-axis detection of laser sources according to claim 10, the method further comprising taking a Radon transform of the single combined binarized image to identify a first location estimate of a path of the laser light in the single combined binarized image.

16. The method for off-axis detection of laser sources according to claim 10, wherein the binarizing the each image comprises applying Otsu's method to the each image.

17. The method for off-axis detection of laser sources according to claim 10, wherein the center wavelength of the optical filter is tunable between 850 nm and 1976 nm.

\* \* \* \* \*